(12) United States Patent
Camarco et al.

(10) Patent No.: US 10,696,314 B1
(45) Date of Patent: Jun. 30, 2020

(54) FOLDABLE CART SYSTEM AND METHOD

(71) Applicant: C5 Enterprises, LLC, Colts Neck, NJ (US)

(72) Inventors: Kenneth Camarco, Colts Neck, NJ (US); Jonathan Albert, Philadelphia, PA (US); Sudhir Kumar, Faridabad (IN); Jason Zerweck, Media, PA (US); Seth GaleWyrick, Victor, MT (US)

(73) Assignee: Invententional Products, LLC, Sherrills Ford, NC (US)

( * ) Notice: Subject to any disclaimer, the term of this patent is extended or adjusted under 35 U.S.C. 154(b) by 0 days.

(21) Appl. No.: 16/132,407

(22) Filed: Sep. 15, 2018

Related U.S. Application Data

(63) Continuation of application No. 15/375,074, filed on Dec. 9, 2016, now Pat. No. 10,106,182.

(60) Provisional application No. 62/265,595, filed on Dec. 10, 2015.

(51) Int. Cl.
| | |
|---|---|
| *B62B 3/02* | (2006.01) |
| *B62B 1/12* | (2006.01) |
| *B62B 5/00* | (2006.01) |
| *B62B 1/00* | (2006.01) |

(52) U.S. Cl.
CPC .............. *B62B 3/022* (2013.01); *B62B 1/002* (2013.01); *B62B 1/12* (2013.01); *B62B 3/02* (2013.01); *B62B 5/0003* (2013.01); *B62B 2205/06* (2013.01); *B62B 2205/12* (2013.01); *B62B 2301/02* (2013.01); *B62B 2301/20* (2013.01)

(58) Field of Classification Search
CPC ............ B62B 3/02; B62B 3/022; B62B 3/027
USPC .................................................. 280/651, 652
See application file for complete search history.

(56) References Cited

U.S. PATENT DOCUMENTS

| | | | |
|---|---|---|---|
| 2,565,820 A | 8/1951 | Machanic | |
| 2,780,474 A | 2/1957 | Farah | |
| 3,074,734 A * | 1/1963 | Munson | ................. A47B 31/04 |
| | | | 280/641 |
| 3,082,016 A | 3/1963 | Pratt | |
| 3,493,262 A * | 2/1970 | Ferneau | ................ B62B 5/0003 |
| | | | 296/20 |
| 3,637,232 A * | 1/1972 | Bourgraf | ............... B62B 5/0003 |
| | | | 280/641 |
| 3,669,031 A | 6/1972 | Cole | |
| 3,782,749 A * | 1/1974 | Wiczer | .................... B62B 1/002 |
| | | | 280/641 |
| 4,192,541 A * | 3/1980 | Ferneau | ............... A61G 1/0565 |
| | | | 280/640 |
| 4,236,462 A * | 12/1980 | Berthier | ................. A47B 31/04 |
| | | | 108/177 |
| 4,284,286 A * | 8/1981 | Lewallen | ................ B62B 1/002 |
| | | | 280/30 |
| 4,478,428 A * | 10/1984 | Ziliani | .................... A47B 31/04 |
| | | | 108/177 |

(Continued)

OTHER PUBLICATIONS

PCT Search Report, dated Sep. 27, 2017.

*Primary Examiner* — Jeffrey J Restifo
(74) *Attorney, Agent, or Firm* — ROARK IP

(57) ABSTRACT

A foldable or collapsible cart can be oriented in several different configurations to accommodate different loads and transport requirements. In one configuration, the cart may be folded for direct load the back of a vehicle. In another configuration, the cart can operate in lowboy or dolly mode. In another configuration the cart may be used as a hand truck.

17 Claims, 33 Drawing Sheets

(56) References Cited

U.S. PATENT DOCUMENTS

| | | | | |
|---|---|---|---|---|
| 5,154,441 A | * | 10/1992 | White | A47B 31/04 108/120 |
| 5,454,625 A | | 10/1995 | Christensen | |
| 5,649,718 A | | 7/1997 | Groglio | |
| 5,927,745 A | * | 7/1999 | Cunningham | A47B 31/04 108/118 |
| 6,045,150 A | * | 4/2000 | Al-Toukhi | B62B 3/027 248/676 |
| 6,070,899 A | * | 6/2000 | Gines | B62B 5/0003 280/43.1 |
| 6,079,777 A | * | 6/2000 | Simmons | A47C 1/143 108/157.17 |
| 6,095,532 A | * | 8/2000 | Martin | B25H 5/00 280/30 |
| 6,152,462 A | | 11/2000 | Barrett | |
| 6,328,319 B1 | | 12/2001 | Stahler | |
| 6,419,244 B2 | | 7/2002 | Meabon | |
| 6,526,611 B2 | | 3/2003 | Flynn | |
| 6,575,491 B2 | * | 6/2003 | Miller | B62B 3/027 280/43.17 |
| 6,578,856 B2 | | 6/2003 | Haddock | |
| 6,701,545 B1 | | 3/2004 | Ferneau | |
| D495,846 S | | 9/2004 | Liu | |
| 6,834,868 B1 | * | 12/2004 | Blackburn | B25H 5/00 280/32.6 |
| 6,860,493 B2 | | 3/2005 | Orozco | |
| 6,883,267 B1 | * | 4/2005 | Pruitt | A01K 97/06 280/47.19 |
| 6,886,836 B1 | * | 5/2005 | Wise | B25H 1/04 280/30 |
| 6,976,696 B2 | * | 12/2005 | O'Krangley | A61G 1/0562 280/638 |
| 7,017,939 B2 | | 3/2006 | Darling | |
| 7,080,844 B2 | | 7/2006 | Espejo | |
| 7,188,847 B1 | | 3/2007 | Friedman | |
| 7,229,093 B1 | * | 6/2007 | Carter | B62B 3/022 280/651 |
| 7,252,302 B1 | | 8/2007 | Thurn | |
| 7,255,355 B2 | * | 8/2007 | Chisholm | B25H 1/04 248/439 |
| 7,331,596 B2 | * | 2/2008 | Tiramani | B25H 1/04 280/30 |
| 7,427,080 B2 | | 9/2008 | Naude, Jr. | |
| 7,513,511 B2 | | 4/2009 | Chaseateau | |
| D608,518 S | | 1/2010 | Luebke | |
| 7,658,388 B1 | | 2/2010 | Rodriguez | |
| 7,806,426 B2 | * | 10/2010 | Van Landingham, Jr. | B62B 3/02 280/47.35 |
| 7,854,444 B2 | | 12/2010 | Zhuang | |
| 8,047,553 B2 | * | 11/2011 | Voong | B25H 1/04 248/129 |
| 8,172,256 B2 | * | 5/2012 | Fine | B62B 3/027 280/38 |
| 8,408,581 B1 | * | 4/2013 | Hunter | B62B 3/027 280/33.993 |
| 8,517,413 B2 | * | 8/2013 | Chen | B25H 1/04 248/370 |
| 8,540,273 B2 | * | 9/2013 | Dobrachinski | B62B 3/027 280/47.34 |
| 8,550,474 B2 | * | 10/2013 | Geva | B62B 3/027 280/35 |
| 8,579,320 B2 | * | 11/2013 | Chiu | B25H 1/04 248/439 |
| 8,814,199 B2 | * | 8/2014 | Shindelar | B62B 3/02 280/47.34 |
| 8,979,115 B1 | * | 3/2015 | Baron | B62B 3/027 280/43 |
| 8,998,246 B2 | * | 4/2015 | Griffard | B62B 3/025 280/47.34 |
| 9,126,610 B1 | * | 9/2015 | Abiri | B62B 5/0003 |
| 9,221,486 B2 | * | 12/2015 | Fine | B62B 5/0003 |
| 9,321,471 B1 | * | 4/2016 | Gedeon-Janvier | B62B 1/002 |
| 9,376,130 B1 | * | 6/2016 | Wise | B62B 1/042 |
| 9,399,476 B1 | * | 7/2016 | Stankevitz | B62B 5/0003 |
| 9,415,503 B1 | * | 8/2016 | Ferragonio | B25H 1/04 |
| 9,573,610 B1 | * | 2/2017 | Chaturvedi | B62B 3/022 |
| 2002/0105169 A1 | | 8/2002 | Dahl | |
| 2006/0038383 A1 | | 2/2006 | Wu | |
| 2007/0187929 A1 | | 8/2007 | Jensen | |
| 2008/0303248 A1 | * | 12/2008 | Chaparro | B62B 3/027 280/651 |
| 2009/0230642 A1 | | 9/2009 | Thomas | |
| 2010/0044983 A1 | | 2/2010 | Panigot | |
| 2011/0169235 A1 | * | 7/2011 | Moster | B62B 3/027 280/30 |
| 2012/0133112 A1 | * | 5/2012 | Myrant | B62B 1/208 280/655 |
| 2013/0292925 A1 | | 11/2013 | Shindelar et al. | |

\* cited by examiner

FOLDABLE CART SYSTEM AND METHOD

CROSS-REFERENCE TO RELATED APPLICATIONS

This application claims the benefit of U.S. patent application Ser. No. 15/375,074, filed Dec. 9, 2016; which claims the benefit of U.S. Provisional Patent Application Ser. No. 62/265,595, filed Dec. 10, 2015; which are both incorporated herein by reference.

FIELD OF THE DISCLOSURE

The present disclosure relates to carts. More particularly, the present disclosure relates to multipurpose foldable carts.

BACKGROUND OF THE DISCLOSURE

Several types of collapsible and foldable carts for transporting articles or goods have been utilized in the past. Generally, these types of foldable carts are used by home owners for transportation of groceries, packages, luggage, duffle bags, ski bags, bowling bags, baseball storage bags, and the like. These foldable carts are also implemented for commercial and light industry usage in the transporting of in process goods, finished products, and the like. The collapsible and foldable nature of these carts provides for easy storage in a vehicle trunk, a storage closet, on a wall, and the like. These carts permit the transport of goods up and down walkways, stairs, escalators, steep hills, dirt trails, and the like, without causing damage to walkway surfaces, such as linoleum, tile, wood, or carpeting. However, conventional hand carts which have been used in the past lack convenience and versatility. For example, they lack maneuverability and handling convenience for the various uses to which such are put in retail establishments or industrial sites. There is needed a hand cart which is well adapted for the purposes mentioned above, and which avoids some of the defects of prior devices of this kind.

SUMMARY

An aspect of the disclosed embodiments include a folding cart comprising: a deck supported by a plurality of front legs and a plurality of rear legs when in an open position; said rear legs each having one of a plurality of link mechanisms coupled to at least one of a plurality of lower hinges which are attached to each of the plurality of front legs and coupled to at least one of a plurality of upper hinges which are attached to the deck; and said plurality of link mechanisms capable of bending the plurality of upper hinges and the plurality of lower hinges to cause the plurality of front legs and plurality of rear legs to fold to a compact position.

Further aspects of the disclosed embodiments include a cart comprising a horizontal deck, two or more vertical support legs for supporting the deck and connected to hinged members each having pivot points, and two or more wheels wherein the cart can be oriented in different configurations to accommodate different loads and transport requirements, the configurations comprising: a first configuration wherein the vertical support members are vertically extended with the horizontal deck on top of the vertical support members, wherein the wheels are on the bottom of the vertical support members and the hinged members are fully extended at the pivot points allowing the vertical support members to sweep toward the back of the cart to form a second configuration; and a second configuration wherein the hinged members are folded about the pivot points so that the support legs are substantially parallel to and under the horizontal surface.

Further aspects of the disclosed embodiments include a method of folding a cart comprising: activate a first control lever to extend a plurality of guide wheels to allow stabilization of the cart on a vehicle platform surface in response to a squeezing of a first control lever to eject; activate a second control lever to apply a force through a cable to a linkage mechanism to pull rear leg lower tray linkages that cause the lower hinge pair to start bending and a rear leg to unlock allowing a rear leg lower tray link pivot pin and rear leg stabilizer brace link pivot pin to slide axially within the linkage mechanism; and push the cart into a vehicle to cause a front leg to be pushed back to be braced against the rear leg causing the lower hinge pair to bend further and the upper hinge pair to start folding and continue until the front legs and rear legs are fully folded.

Further aspects of the disclosed embodiments including a foldable cart which can be oriented in several different configurations comprising: a deck supported by a plurality of front legs and a plurality of rear legs when in an open position; said rear legs each having one of a plurality of means for unlocking the plurality of rear legs (e.g., dual sliding linkage mechanism) coupled to at least one of a plurality of lower hinges which are attached to each of the plurality of front legs and coupled to at least one of a plurality of upper hinges which are attached to the deck; and said plurality of means for unlocking the rear legs capable of bending the plurality of upper hinges and the plurality of lower hinges to cause the plurality of front legs and plurality of rear legs to fold to a compact position.

Further aspects of the disclosed embodiments include a collapsible cart with extending guide wheels that reach beyond extended bumpers to ensure contact and support on a storage deck surface as the cart collapses, including extended guide wheels: (a) that incorporate a safety switch feature, that will depress when the feeler guide wheels flex up upon contact with a horizontal deck to ensure that guide wheels are in contact with the horizontal deck and a load is supported on the front wheels before allowing the legs to collapse; (b) that are spring loaded and will collapse back into the frame to allow compact storage into back of the vehicle; and (c) that include omni-directional rotation that allows easy 90-degree rotation of the cart into the storage area when depth of the storage area will not allow "straight in" storage. These aspects further comprise electric power via battery capability and/or extendable AC power cords to accommodate the latest electronic technologies inclusive of radio frequency identification technology.

Further aspects of the disclosed embodiments include a folding cart comprising: a deck supported by a plurality of front legs and a plurality of rear legs when in an open position; said rear legs each having a sliding bearing mechanism coupled to a lower hinge which is attached to each of the plurality of front legs and coupled to an upper hinge which is attached to the deck; and said sliding bearing mechanism capable of bending the upper hinges and the lower hinges to cause the plurality of front legs and plurality of rear legs to fold to a compact position.

Further aspects of the disclosed embodiments include a folding cart comprising: a deck supported by a plurality of front legs and a plurality of upper diagonal supporting struts, wherein the upper diagonal supporting struts are supported by lower diagonal supporting struts and rear legs when in an open position; said upper diagonal supporting struts, lower diagonal supporting struts and rear legs are joined by a three way joint mechanism, wherein the three way joint mechanism is capable of moving to cause the plurality of front legs and plurality of rear legs to fold to a compact position. The three way joint mechanism may further include: a joint hinge having locking gear that engage to mating parts to lock the joint hinge into position when the cart is in an open position. The three way join mechanism may further include: three rings under compression when the cart is in the open position and the three rings separated when the cart is in the compact position.

Further aspects of the disclosed embodiments include: a folding cart comprising: a deck supported by a plurality of front legs and a plurality of rear legs when in an open position; said rear legs each having a one of a plurality of link mechanisms coupled to a plurality of lower hinges which are attached to each of the plurality of front legs and coupled to a plurality of upper hinges which are attached to the deck; and said plurality of link mechanisms upon activation being capable of bending the plurality of lower hinges and the plurality of upper hinges sequentially to cause the plurality of front legs and the plurality of rear legs to fold to a compact position.

Further aspects of the disclosed embodiments include a cart comprising a horizontal deck, two or more vertical support legs for supporting the deck and connected to hinged members each having pivot points, and two or more wheels wherein the cart can be oriented in different configurations to accommodate different loads and transport requirements, the configurations comprising: a first configuration wherein the vertical support members are vertically extended with the horizontal deck on top of the vertical support members, wherein the wheels are on the bottom of the vertical support members and the hinged members are fully extended at the pivot points allowing the vertical support members to sweep toward the back of the cart wherein the vertical support members fold only at one end of each of the vertical support members; and a second configuration wherein the hinged members are folded about the pivot points so that the support legs are substantially parallel to and under the horizontal surface.

Further aspects of the disclosed embodiments include a method of folding a cart comprising: activate a first control lever to extend a plurality of guide wheels to allow stabilization of the cart on a vehicle platform surface in response to a squeezing of a first control lever to eject; activate a second control lever to apply a force through a cable to a linkage mechanism to pull rear leg lower tray linkages that cause the lower hinge pair to start bending and a rear leg to unlock allowing a rear leg lower tray link pivot pin and rear leg stabilizer brace link pivot pin to slide axially within the linkage mechanism while the rear leg fold only at a top of the upper leg section; and push the cart into a vehicle to cause a front leg to be pushed back to be braced against the rear leg causing the lower hinge pair to bend further and the upper hinge pair to start folding and continue until the front legs and rear legs are fully folded.

BRIEF DESCRIPTION OF THE DRAWINGS

Aspects of the embodiments of this disclosure are illustrated by way of example. While various details of one or more techniques are described herein, other techniques are also possible. In some instances, well-known structures and devices are shown in block diagram form in order to facilitate describing various techniques. A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one portion or part of a larger element or one of multiple similar components. When reference is made to a reference numeral without specification to an existing sub-label, the reference numeral refers to all such similar components.

DETAILED DESCRIPTION OF THE DISCLOSURE

Although there are many devices or carts available to move materials from place to place, virtually all unpowered devices require "lifting" of either, the payload (i.e. the carried materials, tools, resources, etc.), the carrier cart/truck, or even both at multiple steps of the transportation process. For example, grocery shopping requires loading and unloading of the shopping cart multiple times to get the groceries/merchandise from store shelf to the kitchen pantry shelf in one's house. Many similar examples exist in industrial manufacturing, assembly and logistics, and as well in commercial construction professional trades in movement of tools, materials and other resources to and from a job site, workbench and other points of use.

The foldable (or collapsible) cart described herein is intended to serve multiple purposes for the efficient, ergonomic and safe handling of goods between stores, homes, vehicle and various places of work. The cart of this disclosure minimizes the lifting required to move and transport various materials and goods from place to place by allowing one time placement atop the cart and then allowing easy transport to a vehicle and further allowing complete collapsing of the cart and materials together in a compact form into the back of vehicle (namely sport utility vehicles (SUVs), pickup trucks, crossovers and other sedans with minimal drop from trunk lip to cargo floor). Due to its unique and flexible design the cart disclosed herein can preferably be further utilized as a vertical hand truck for specific applications and/or as a lowboy trolley when heavier payloads are required and lifting to and from a higher surface is not required. Additionally, when folded horizontally to ground the cart may also be used as a garage mechanic's creeper.

The foldable carts described herein can operate in at least one of three modes of operation. First, they can be in open or upright position for use, for example, in shopping or as table workstation (i.e., open position). Second, they can operate in a "lowboy" mode for carrying loads in a position lower to the ground than open mode, for example, as an industrial stock cart or mechanic's creeper. Third, the carts can be configured as a hand truck for carrying loads on a fold out toe plate. So the foldable cart, in at least some embodiments, could be a simple open cart that can be collapsed from an open position to a compact form (open position mode); a two-in-one cart (open position and lowboy mode); or a three-in-one cart (open position mode, lowboy mode, and/or hand truck mode).

Figure 1:
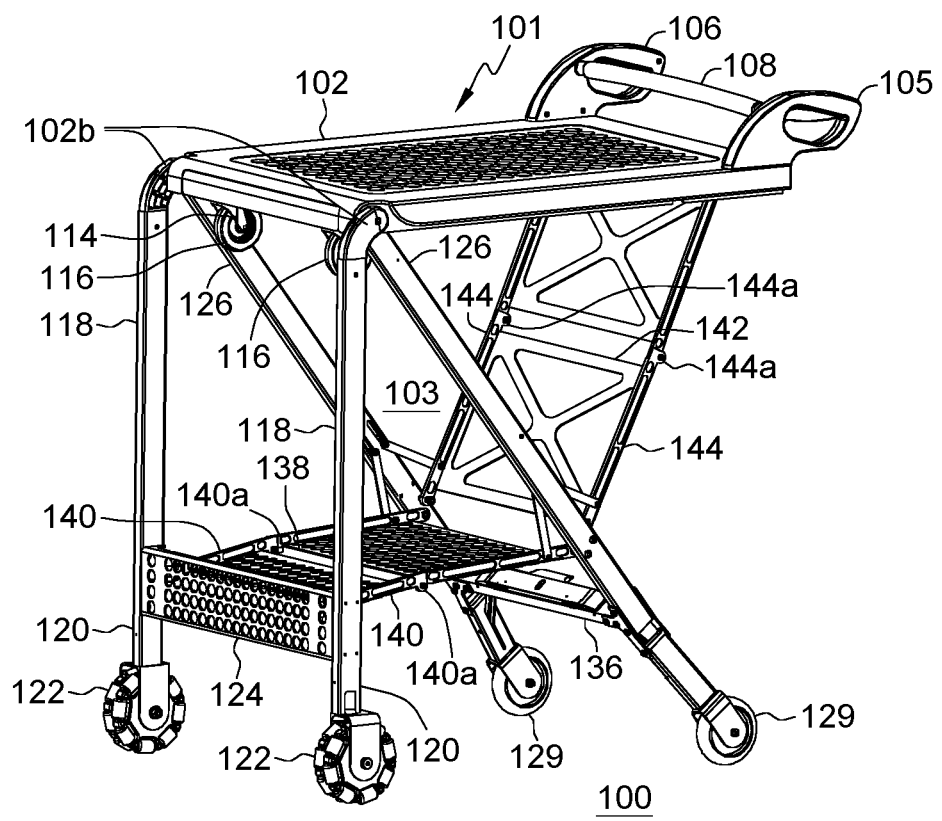
FIG. 1 is a perspective view of a first embodiment of the apparatus of the present disclosure.
Figure 2:
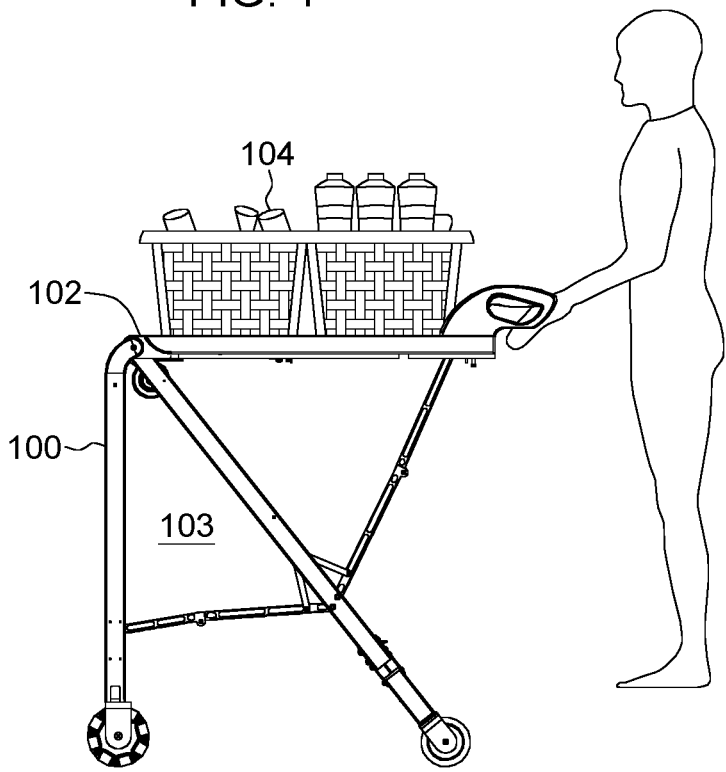
FIG. 2 is a side view of the first embodiment in operation carrying a load and pushed by an operator.
Figure 3:
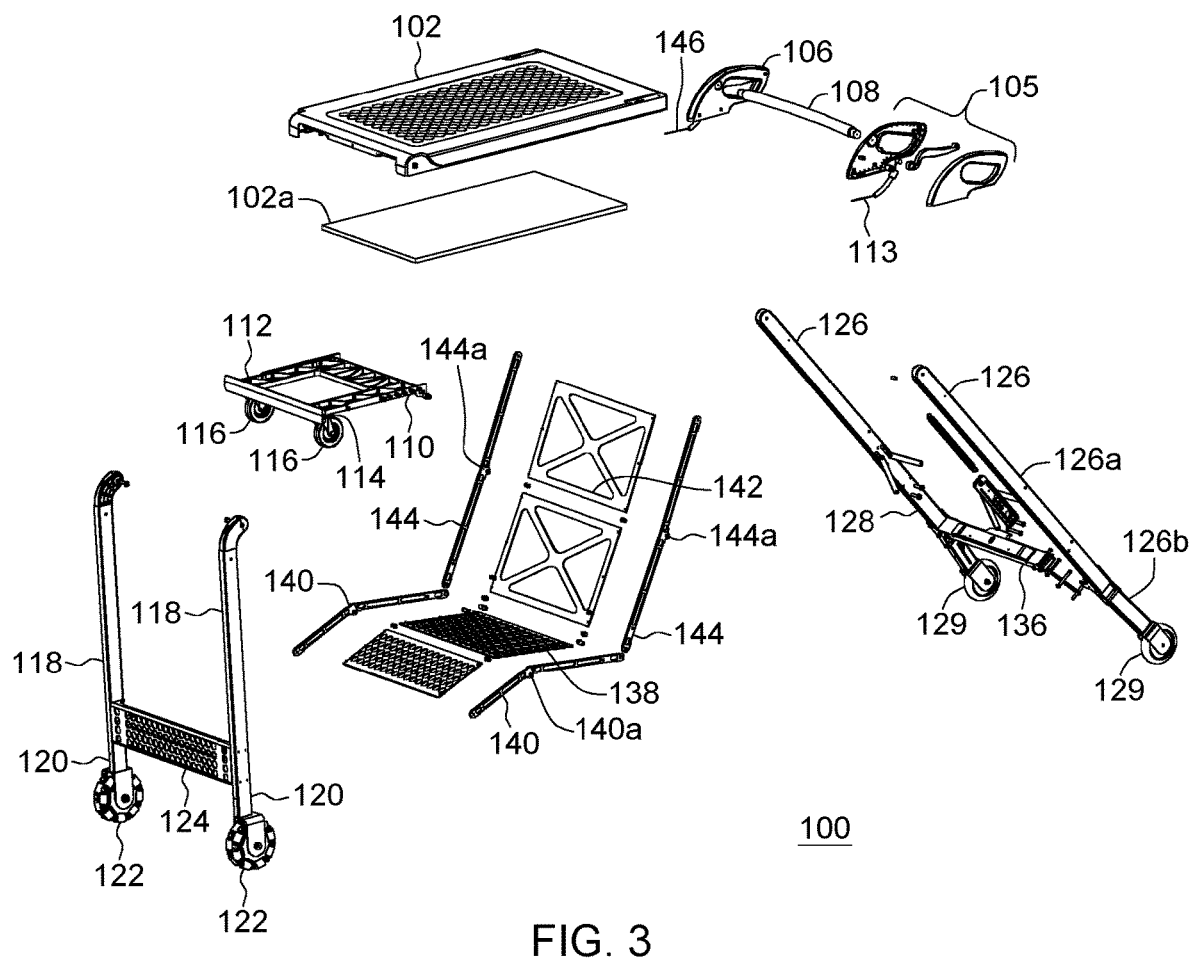
FIG. 3 is an exploded view of the parts of the cart of the first embodiment.
Figure 4:
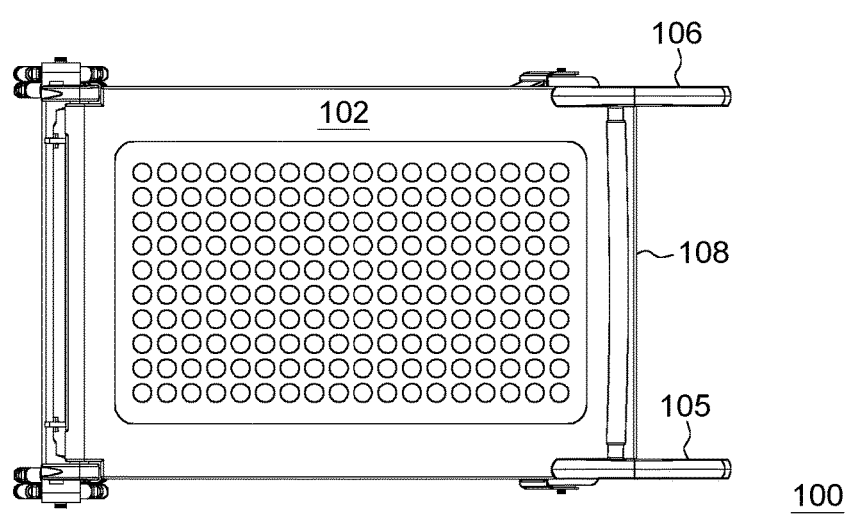
FIG. 4 is a top view of a first embodiment of the cart.
Figure 23A:
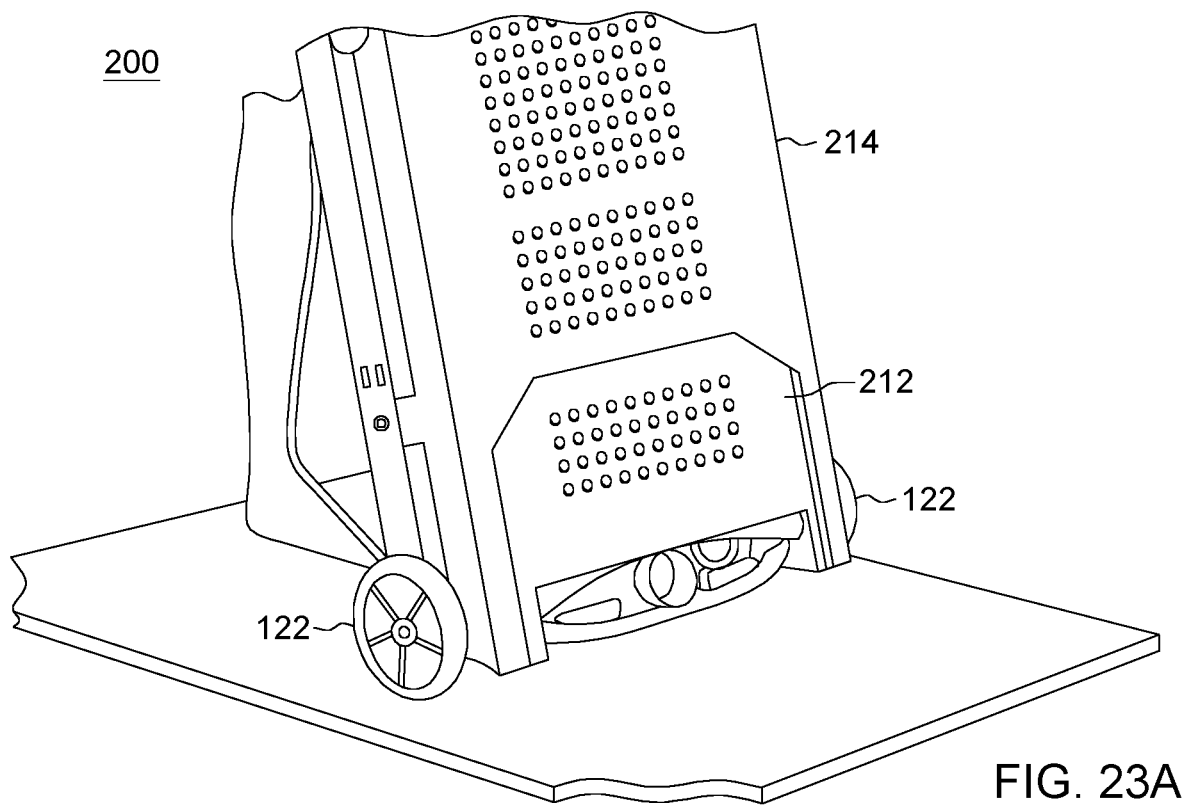
FIGS. 23A-23B show the cart fourth embodiment (which could be the first embodiment as well) with a toe plate and handles.
Figure 23B:
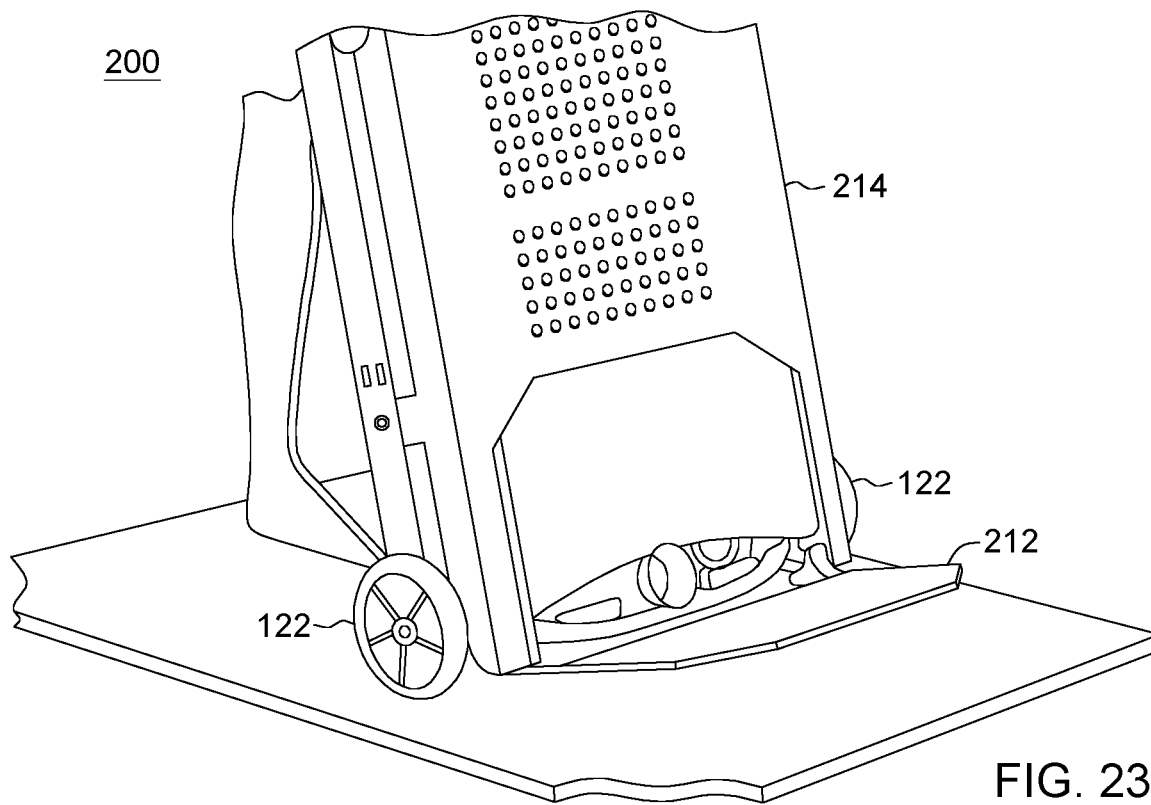

FIGS. 1-17G show different views of a first embodiment of a foldable (or collapsible) cart 100. The foldable cart 100 of the present disclosure can be built in different sizes and weight carrying capability to accommodate different uses, and varying frame dimensions, wheel capacity and joint sizing to accommodate heavier or lighter loads depending on intended usage. As shown in FIGS. 1 and 2, the primary elements of the cart are an upper "deck assembly" able to support a load, a "guide wheel assembly", and a lower "multi-bar linkage frame support system". The area above the deck assembly can be called a first storage area 101 of the cart 100. The deck assembly may include an "adaptable table deck" (or deck) 102, an optional reinforcing support plate 102a (as shown in FIG. 3) which may not be needed if the deck 102 is made up of a strong enough material, a "first ergonomic hand grip and control lever release" 105 for releasing the guide wheels, a "second ergonomic hand grip and control lever release" 106 to start the folding process and a "handle crossbar" 108 for the operator to push and/or lift the cart. In an alternative embodiment, the adaptable table deck 102 may further include a toe plate 212 as shown in FIGS. 23A-23B which would allow the cart 100 to be turned into a hand truck when tilted. Referring to FIG. 3, the guide wheel assembly is made up of "guide wheel lock housing" 110, extendible "guide wheel roller plates" 112, "guide wheel axle assembly" 114, and "guide wheels" (or feeler guide wheels or caster wheels) 116. In alternative embodiments, the guide wheels could be replaced with just a guide (without wheels) or smooth (or slick) plastic surface. The multi-bar linkage frame support system (or more simply the "frame") may be made up of elements such as a pair of "front legs" 118 and a pair of "rear legs" 126. A pair of bearing fasteners 102b may be rotating pivots used to join the pair of front legs 118 and rear legs 126 to deck 102. The frame may further include a "tray" 138, "lower hinge pair" 140 which are hinged 140a and bendable in the middle, "stiffener brace" 142, and "upper hinge pair" 144 which are also hinged 144a and bendable in the middle to support the deck assembly and allow for collapsing of the cart 100. These frame elements enclose a second storage area 103 of the cart 100. Note that each of the pair of rear legs 126 have an upper rear leg section 126a and a lower rear leg section 126b (as shown in FIG. 3). The pair of lower rear leg sections 126b may also be called rear leg lower extendible inserts where the rear wheels 129 are mounted. The lower rear leg lower extendible inserts 126b may be folded about rear leg hinge 127 as shown in detail in FIG. 10 to the rear wheels 129 not to stick while the cart 100 is in compact form in a cargo bay of a vehicle.

Adaptable table deck 102 can be configured to accommodate virtually any load, either placed directly on the table deck surface, secured to the table deck surface, or contained within a basket or crate and placed on the table deck. FIG. 2 shows the table deck 102 supporting a load 104 while being pushed by an operator. In open (or upright) mode, as shown in FIGS. 1 and 2, a load on the adaptable table deck 102 may be up to (and including) 175 pounds. By placing loads in both the first storage area 101 and second storage area 103 the cart 100 can overall carry loads up to (and including) 250 pounds. In lowboy mode, in a second embodiment as shown in FIG. 18B, the collapsible cart 100 can hold even more weight, for example, up to (and including) 500 pounds. The table deck 102 could be injection molded out of high strength plastic or glass reinforced plastic or may be made from sheet aluminum. The table deck 102 may be an integral singular molded/formed deck and rigid structure piece or, alternatively, a deck secured to an outer rigid structure by screws or rivets (optionally with the reinforcing support plate 102a). A plurality of slots may be included on the deck 102 to allow the securing of a load 104 such as a carrying container (e.g., a basket or crate). A load in the form of a removable carrying container may sit on the table deck 102 with some portion of its base geometry protruding through the deck slots and allowing it to be secured by a locking rod, hook or other method. Similarly other loads (e.g., a miter saw) could be bolted or latched onto the table deck 102 directly to secure it. In alternative embodiments, as described above, the table deck 102 could have a cut out section to allow for a fold out toe plate 212 (as shown in FIGS. 23A-23B) to rest flush on the same plane as the rest of the deck 102 when not deployed. An incorporated cup holder and accommodations for other attachments could also be included in the table deck 102 as well.

Figure 7:
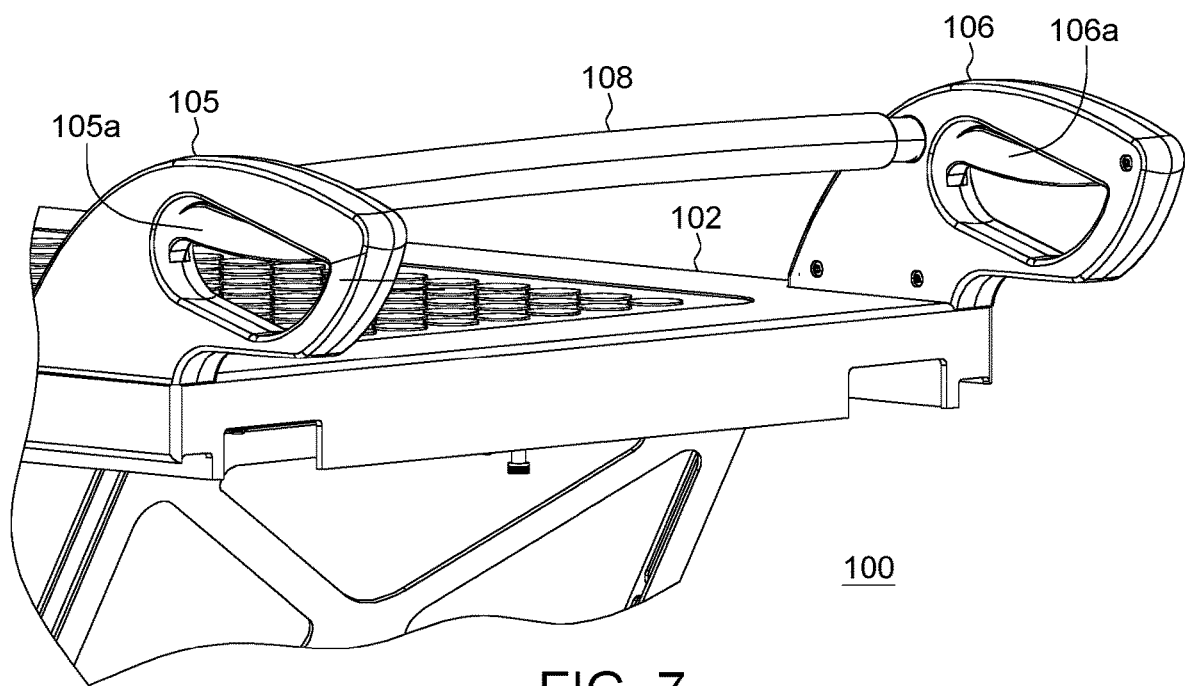
FIG. 7 a perspective view of the ergonomic grip and release handles on the cart of the first embodiment from the operator's view.
Figure 8:
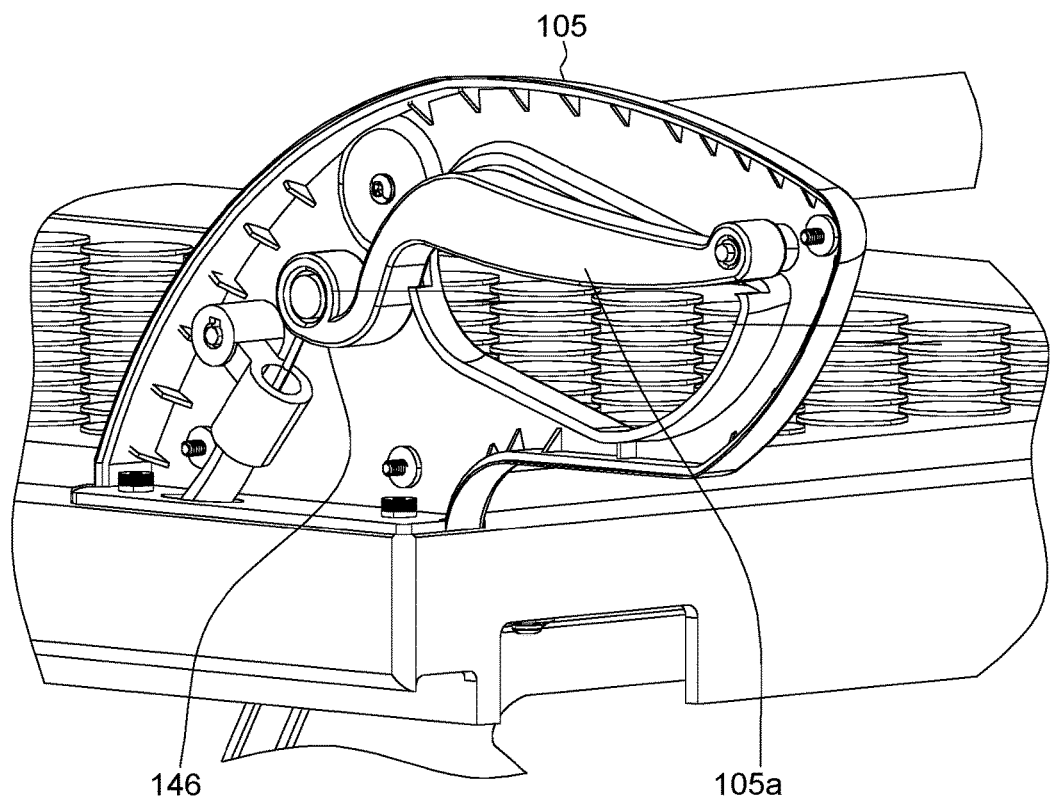
FIG. 8 is a cross-sectional, detailed perspective view of one of the first ergonomic grip and release handles used to extend the guide wheels in the first embodiment of the cart.
Figure 9:
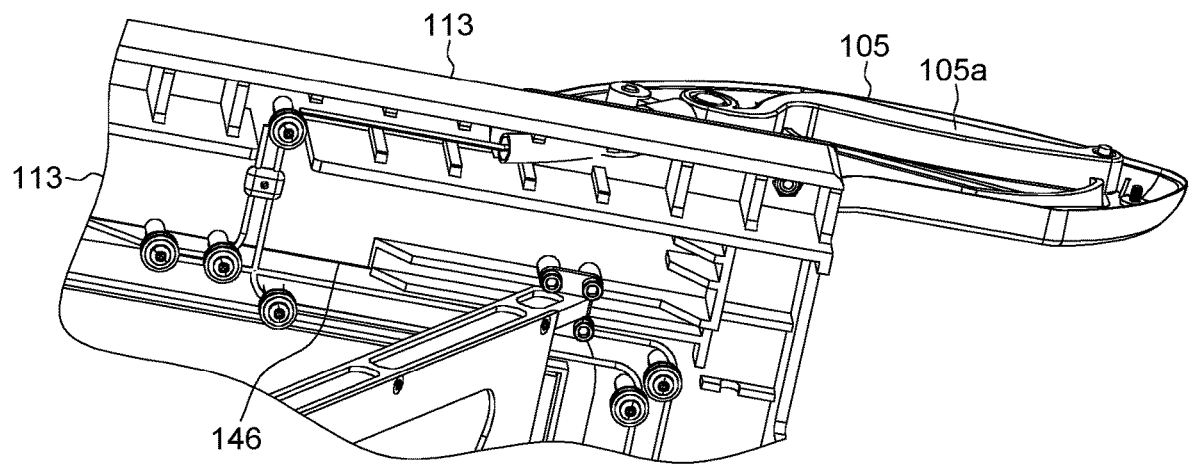
FIG. 9 is a view of a section of underneath the deck assembly of the cart of the first embodiment.

Further details of the deck assembly as shown in an operator perspective view in FIG. 7 include first ergonomic hand grip and control lever release 105 and second ergonomic hand grip and control lever release 106 (i.e., "hand grips") joined by crossbar handle 108 and mounted to table deck 102. The hand grips 105 and 106 as well as crossbar handle 108 provide a place where the operator can get a solid hold on the cart 100 during operation. The hand grips 105 and 106 can be attached to the table deck 102 and frame below with fasteners (e.g., screws, threaded bolts, and/or rivets) or molded integrally with the table deck 102. The handle grips 105 and 106 may be made of metal or plastic. The crossbar handle 108 may be made from either aluminum tube and overlaid with a cushioned rubber or from high strength molded plastic with a cushioned overlay of softer durometer plastic or some other durable materials. In alternative embodiments, the hand grips 105 and 106 can take any of various forms and construction (e.g., triggers, levers, bicycle handles, push buttons, etc.). In operation, a first control lever (or trigger) 105a in first ergonomic hand grip and control lever release 105 can be used to extend the pair of guide wheels 116 for feeling the way into the cargo storage area of a vehicle while simultaneously supporting the load along the way (discussed in more detail below). A cutaway version of hand grip 105 is shown in FIG. 8 and an underside view is shown in FIG. 9. The second ergonomic hand grip and control lever release 106 is a rear leg lock (or pivot) controller which has a second control lever (or trigger) 106a which can be pulled or squeezed by the operator (e.g., in an upright direction) to fold the cart 100. When squeezed, the control lever 106a will pull rear leg release cable 146 to move a plurality of elements of the cart 100 (as discussed in detail below) to fold the cart 100.

Figure 5A:
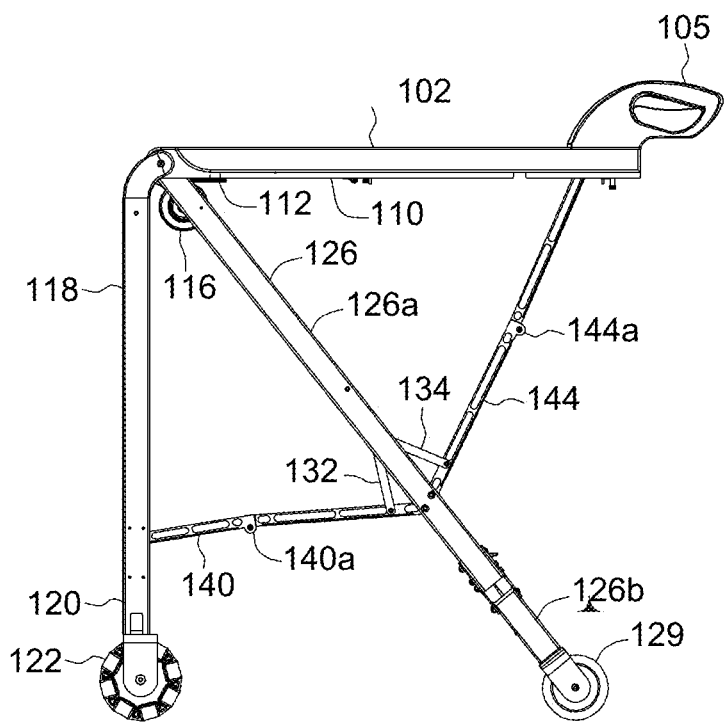
FIG. 5A is a side view of the exterior of the first embodiment of the cart with guide wheels retracted.
Figure 5B:
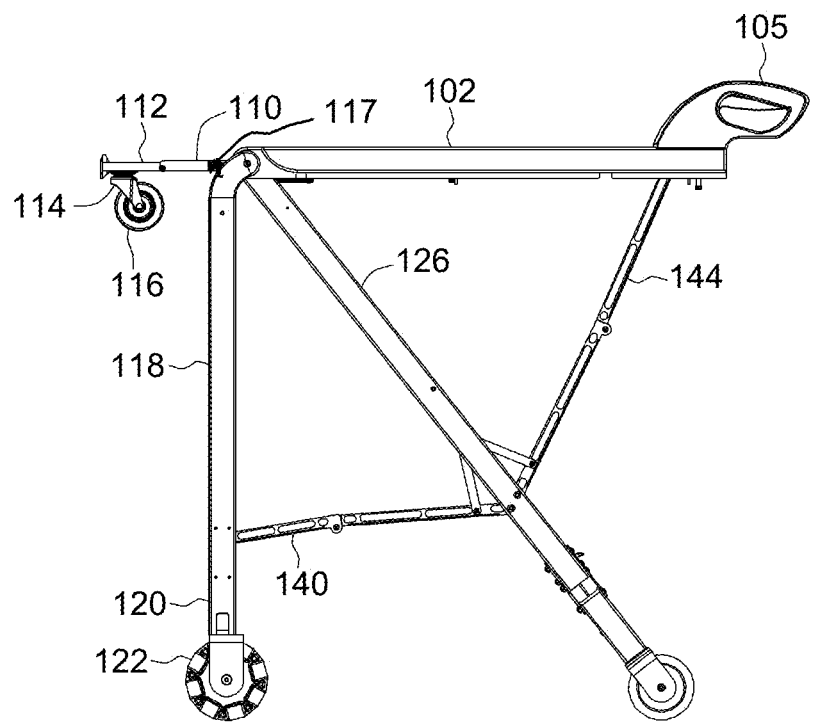
FIG. 5B shows the same view as FIG. 5A except with the guide wheels extended.
Figure 15:
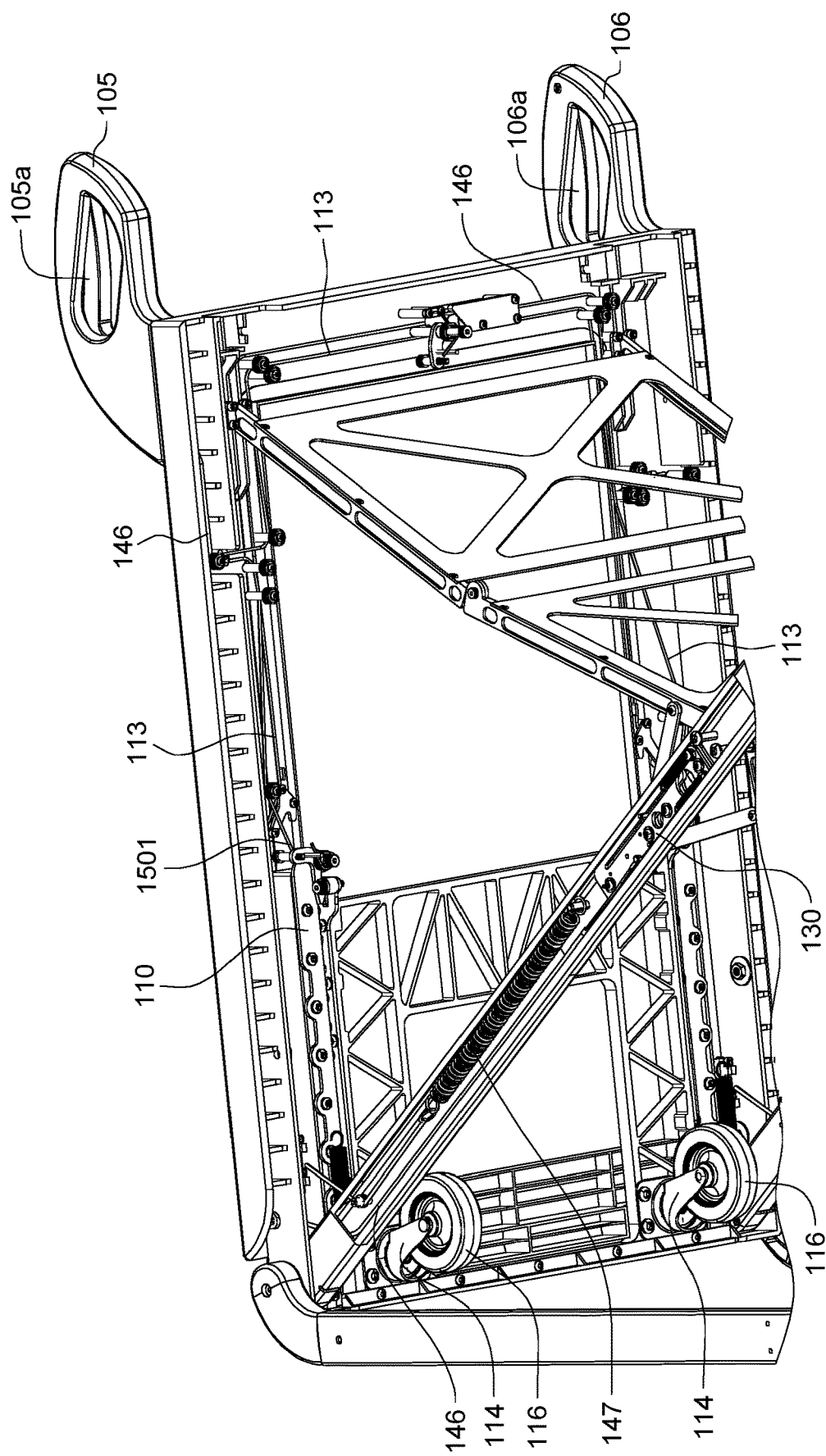
FIG. 15 is a perspective view of the underside of the cart of the first embodiment showing the wiring throughout the cart of the guide wheel cable and rear leg release cable.

As shown in FIGS. 3, 5A, 5B, and 15, element 110 represents a pair of guide wheel lock housings located under the deck assembly and from which extendible guide wheel roller plates 112 can slide from a first position shown in FIG. 5A and to second position as shown in FIG. 5B. The roller plates 112 are activated by first control lever 105a of handle grip 105. Upon activation of control lever 105a, guide wheel cable 113 is pulled which in turn pulls on a release latch 1501 (as shown in FIG. 15) in guide wheel lock housing 110 and thereby releases the guide wheel roller plates 112 which are forced out by extension springs contained in the guide wheel lock housings 110. Typically, the control lever 105a releases the latch to allow the guide wheels 116 to spring out (or extend), but to reset they are typically manually pushed back into the guide wheel lock housing 110. The extendible guide wheel roller plates 112 each may have a guide wheel axle assembly 114 which each include a guide wheel 116. The guide wheels may be omnidirectional wheels as shown in FIG. 15. Guide wheels 116 extend into a vehicle 162 (as shown in FIGS. 17A-17G) as feelers and load bearers during loading and unloading. The guide wheels 116 may include swivel capability and/or brakes (e.g., caster wheels). Since the wheels 116 may be caster and/or omni-directional wheels they allow for omni-directional rotation to allow cart 100 to be swung or easily positioned into the cargo storage area of a vehicle when the cart 100 is in the folded, compact configuration. This feature allows for easy 90-degree rotation of the cart into the vehicle storage area when depth of the cargo storage area will not allow "straight in" storage. The guide wheels 116 are extended and retracted for front load support when entering rear of vehicle storage area means compact overall length of the cart 100. The guide wheels 116 may roll over the vehicle's rear cargo area or tailgate and into the vehicle's rear storage/cargo area. For safe operation, the operator holds hand grip 105 while first lever 105a is squeezed (or triggered) so the guide wheels 116 are extended in advance, and then held, while simultaneously holding hand grip 106 and pulling lever 106a to allow the folding sequence of the frame legs (118, 126) to occur (as shown in detail in FIGS. 17A-17E).

The extending guide wheels 116 are capable of reaching beyond extended (or protruding) bumpers of vehicles to ensure contact and support for storage deck 102 on the cargo area of a vehicle as the cart folds into a compact form. The extended guide wheels 116 may incorporate a safety switch feature (not shown), that will depress when the guide wheels 116 flex up upon contact with a cargo area surface to ensure that wheels 116 are in contact with the cargo storage area and a load is supported on the front wheels 122 before allowing the legs (118, 126) to collapse. As discussed above, the guide wheels 116 may be spring loaded and configured to be manually pushed back into the frame to allow compact storage into the cargo area of the vehicle.

Figure 5C:
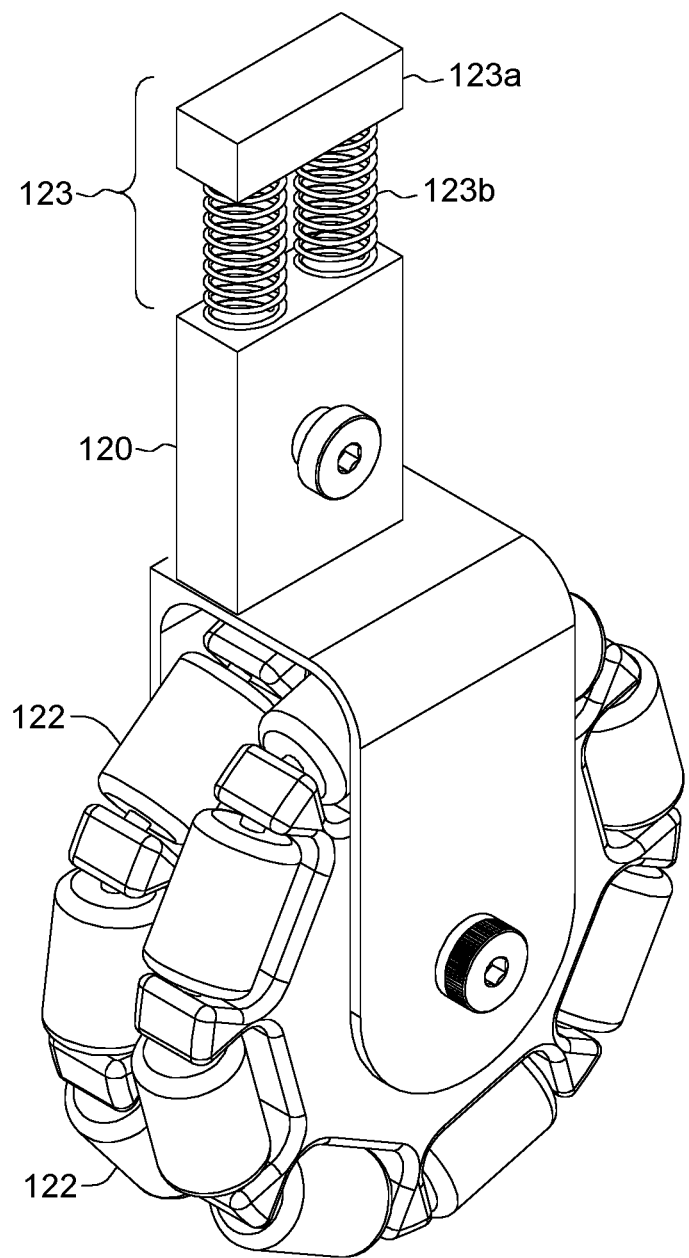
FIG. 5C shows a perspective view of the shock absorbers for the front wheels of the first embodiment of the cart.
Figure 6:
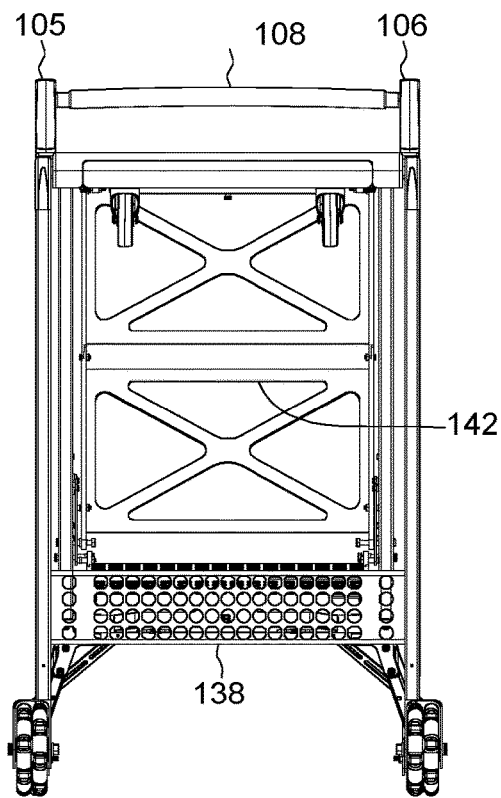
FIG. 6 is a rear operator view of the cart of the first embodiment.

Most parts of the multi-bar linkage frame support system (or the frame) of the cart 100 are in pairs and are mirrored about an imaginary center line of the cart 100. Referring again to FIGS. 1 and 3, the frame includes a pair of front legs 118 and a pair of rear legs 126 that are affixed to the deck assembly on both sides of the cart 100 (i.e., at bearing fasteners 102b) and that make up an integrated, rigid and lightweight frame. The elements of the frame allow for strong structural integrity, anti-sway and ease of folding into a compact "near flat" storage. Front legs 118 and rear legs 126 may be constructed of extruded aluminum. The frame will allow for attachment of the deck 102, guide wheel lock housing 110, lower hinge pair 140, and upper hinge pair 144 to the frame underside (to be discussed in detail below). The pair of front legs 118 each have front leg inserts 120 and front leg wheels 122. The front leg wheels 122 may either be in contiguous pairs on each front leg 118 as shown in FIG. 5C or may be individual wheels on each front leg 118. The front leg inserts 120 allow for adjustment of height for the deck 102 from the ground to match the height off the ground of the vehicle cargo storage area. In addition, the front legs 118 and rear legs 126 may have shock absorber assemblies 123 incorporated therein or as part of inserts 120 as shown in FIG. 5C. The shock absorber assemblies are made up of an aluminum block 123a to fix the shock absorber assemblies to the front legs 118 and springs 123b (e.g., helical compression spring) to provide cushioning. The stiffness of the springs 123b may be determined based on the load on the cart 100. One spring or two springs may be used here. The same type of shock absorber assemblies could also be included in the rear legs 126.

A front stabilizer brace 124 as shown in FIG. 3 stabilizes the front legs 118. Rear legs 126 are made up of upper rear leg section 126a and a lower rear leg section 126b substantially diagonal to the vertical when the cart 100 is in the upright, open position. Housed within each of the diagonal rear legs 126 forming the lower rear leg section are rear leg lower extendible inserts 126b (or swing legs) connected to rear wheels 129 (shown in detail in FIG. 10). Attached to each rear leg 126 is a dual sliding linkage mechanism (DSLM) element 130 (or means for unlocking the rear legs) shown in FIG. 12 which allows the rear legs 126 to be locked when the cart 100 is in the upright, open position which will be discussed in detail below. A rear stabilizer bracer 136 as shown in FIG. 3 keeps the rear legs 126 steady during operation. Rear stabilizer brace 136 is one of several anti-sway braces which may be included in the cart 100. The anti-sway bracing (124, 136) may be constructed of, for example, extruded aluminum, steel and/or high strength plastics. Geometry of the anti-sway bracing can vary, and in alternative embodiments the front leg bracing 124 may be shaped or configured to serve as a sliding and pivoting feature to allow for easy position of the cart 100 in the rear of the vehicle. Between front legs 118 and diagonal rear legs 126 are a plurality of additional stabilizing elements for the frame. Tray 138 is attached on each side of lower hinge pair 140 to form the second storage area 103 for carrying a load. Stiffener brace 142 is attached on each side to upper hinge pair 144. The lower hinge pair 140 are coupled to the pair of front legs 118 and the pair of rear legs 126. Each of the lower hinge pairs have a lower hinge pair joint 140a which allows the lower hinge pairs 140 to bend approximately in the middle. The upper hinge pair 144 are connected to the pair of rear legs 126 and the deck assembly. Each of the upper hinge pairs have an upper hinge pair joint 144a which allows the upper hinge pairs 140 also to bend approximately in the middle.

FIGS. 5A and 12-15 are side views of cart 100 which show dual linkage sliding mechanism 130 with rear leg lower tray linkage pair (or links) 132 and rear upper hinge pair linkage (or links) 134. The dual sliding linkage mechanism 130 helps enable safe folding of the foldable cart 100 to prevent the cart from folding prematurely. Each of the pair of links 132 enable folding of the lower hinge pair 140. One end of each of the links 132 are fastened to each of the lower hinge pairs 140 and the other end of each of the links 132 are capable of sliding during the cart folding and expanding sequence of movements inside the dual sliding linkage mechanism 130. Each of the pair of links 134 enable folding of upper hinge pairs 144. Each pair of links 134 have one end fastened to the upper hinge pair 144 and the other end of the links 134 also slide in the dual sliding linkage mechanism 130 during folding or expanding operations. The links 132, 134 may be made from aluminum plate, steel, or similar materials. The links 132, 134 are oriented side by side and jointed together through hinged joints including axle bolts and bushings. The links 132, 134 lengths, angles and separation allows for easy single step deployment of the cart 100 as well as rigid and stable cart behavior when extended and compact storage when folded. Each of the lower hinge pair joints 140a and upper hinge pair joints 144a may include bushing blocks attached to the underside of the frame or through bushing bearings included in the frame and/or legs and linkages themselves. The joints 140a, 144a may be hinged and utilize an axle bolt or shaft that goes through the bushing bearing and is secured on both ends by virtue of the bolt head and a nut. Washers may be used to create bearing surfaces for the bolt head and the nut. Other manufacturing techniques may also be utilized (e.g., riveting, swaging the end of the bolt or axle shaft on the ends).

In operation, brakes on the guide wheels 116 in the guide wheel axle assembly 114 may be either manually engaged/disengaged by foot, by hand alone, or by hand through a cable to the handle grip 105. Alternatively, as previously discussed, the guide wheels 116 are configured to extend over the protruding rear bumper and engage the vehicle's storage deck surface directly. In either alternative, while the cart 100 is being taken from an open, expanded position to a folded position, the guide wheels 116 allow support of the cart 100 and load weight on the vehicle. As the operator squeezes second control lever 106a on hand grip 106 to "unlock" rear leg lower tray linkage 132 which allow supporting front legs (118) to start folding. At this part of the sequence of events, the operator preferably supports with minimal necessary force the back half of the distributed load while pushing the cart 100 with the load into the rear storage/cargo area of the vehicle. The extendable guide wheels 116 allow the cart 100 to reach out beyond the protrusion of an extended automobile bumper. As discussed above, the guide wheels 116 are attached to the frame. These guide wheels 116 will be normally tucked back into the frame under the deck assembly in a first guide wheel position as shown in FIG. 5A, but may be rigidly fixed, or spring loaded to deploy when the first control lever 105a is squeezed by the operator to a second extended guide wheel position as shown in FIG. 5B. See for example the linkage described in U.S. Pat. Nos. 6,575,491 and 7,976,112 either of which could be used in the present disclosure to perform this function and are hereby incorporated by reference. The guide wheels 116 can be pushed back at any time into the first guide wheel position of FIG. 5A. For example, the guide wheels 116 may be maneuvered against the back seat of a car to put them back in the frame or may be manipulated by hand back into the frame of the cart 100. If the guide wheels are in the first guide wheel position before extension, the cart 100 may be configured to prohibit second control lever 106a from moving and therefore prohibit cart folding. However, upon extraction from the vehicle, if the guide wheels 116 are pushed back into first guide wheel position and locked, the legs 118, 126 will still deploy/extend when the cart 100 is extracted from a vehicle. Control lever 105a of handle grip 105 is typically configured to be re-released upon extracting the cart 100 from the vehicle cargo storage. In alternative embodiments, a safety lock 117 is incorporated into the guide wheel axle assembly 114 (e.g., each guide wheel 116) that would indicate it is under load. Specifically when the guide wheels 116 are in rolling contact with the vehicle cargo surface, the guide wheels 116 would deflect and allow disengagement of each of the pair of dual sliding linkage mechanisms 130 that secures the rear legs 126. For example, the dual sliding linkage mechanisms 130 could not disengage unless either the guide wheels 116 were deflected or the safety lock was manually disengaged.

Figure 13:
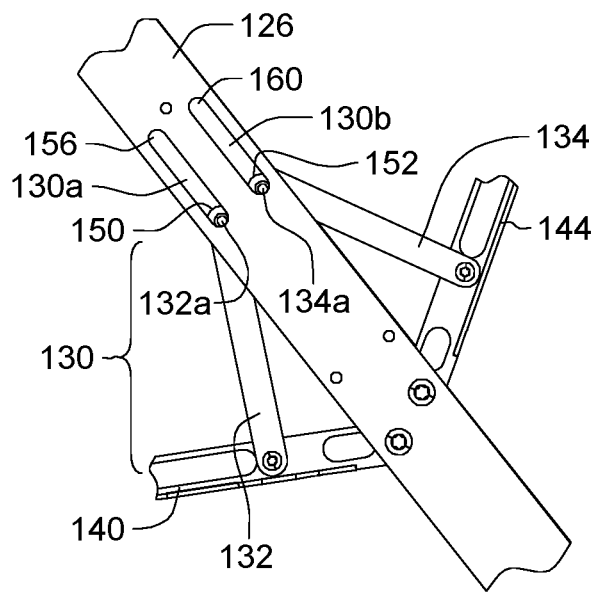
FIG. 13 is a side view of a cutaway section of the rear leg showing the dual sliding linkage mechanism of the cart of the first embodiment.

To fold (or collapse) the cart 100 from the expanded, open position, first control lever 105a of handle 105 is pulled by the operator to extend the guide wheels 116 and the second control lever 106a of handle 106 is pulled by the operator to actuate each of the pair of dual sliding linkage mechanisms 130 through a rear leg release cable 146 as shown in FIGS. 11, 12 and 14A-17. Rear leg release cable 146 is attached at one end to the control lever release 106a and at the other end to lower link pivot pin 132a of the dual sliding linkage mechanism 130 as shown in detail in FIGS. 14A-16. A spring 147 is positioned in each of the rear legs 126. The spring 147 may be an extension spring which acts to help lift and fold the rear legs 126 upon release of the pivot pins (or locking pins) 132a and 134a when going into the back of a vehicle. A polyvinyl chloride (PVC) or rubber sleeve may surround each spring 147 to prevent a rattling noise during operation. A first rear leg spring attachment point 148a is where the spring 147 is connected to a spring wire cable 149 affixed to an anchor point under the table deck 102 and a second rear leg spring attachment point 148b is where the spring 147 is connected to the rear leg 126 itself. When the second control lever 106a of handle 106 is pulled (or squeezed) by the operator the rear leg release cable 146 through rear leg release cable dual pull release 146a (discussed in connection with FIG. 16) will release the link pivot pins 132a on each rear leg allowing each of the pair of the links 132 in the dual sliding linkage mechanisms 130 to move in DSLM first tracks 130a as shown in FIG. 13. The movement of the pair of links 132 causes the front legs 118 to start folding. As each pin 132a travel beyond approximately 50% to 75% along each of the pair of first tracks 130a, the pins 132a will move each of the pair of locking levers 130c which then releases pins 134a to begin travel in each of the second tracks 130b which then releases rear legs 126 to allow them to fold. It should be noted during opening operation of the cart 100, the weight of the legs 118, 126 and gravity force is enough to overcome the lift tension springs in the rear legs 126 and the legs 118, 126 will automatically deploy upon extraction from the back of a vehicle. In an alternative embodiment, as discussed above, an additional safety lock may be used to prohibit the inadvertent unlocking of the links 132, 134.

Figure 14A:
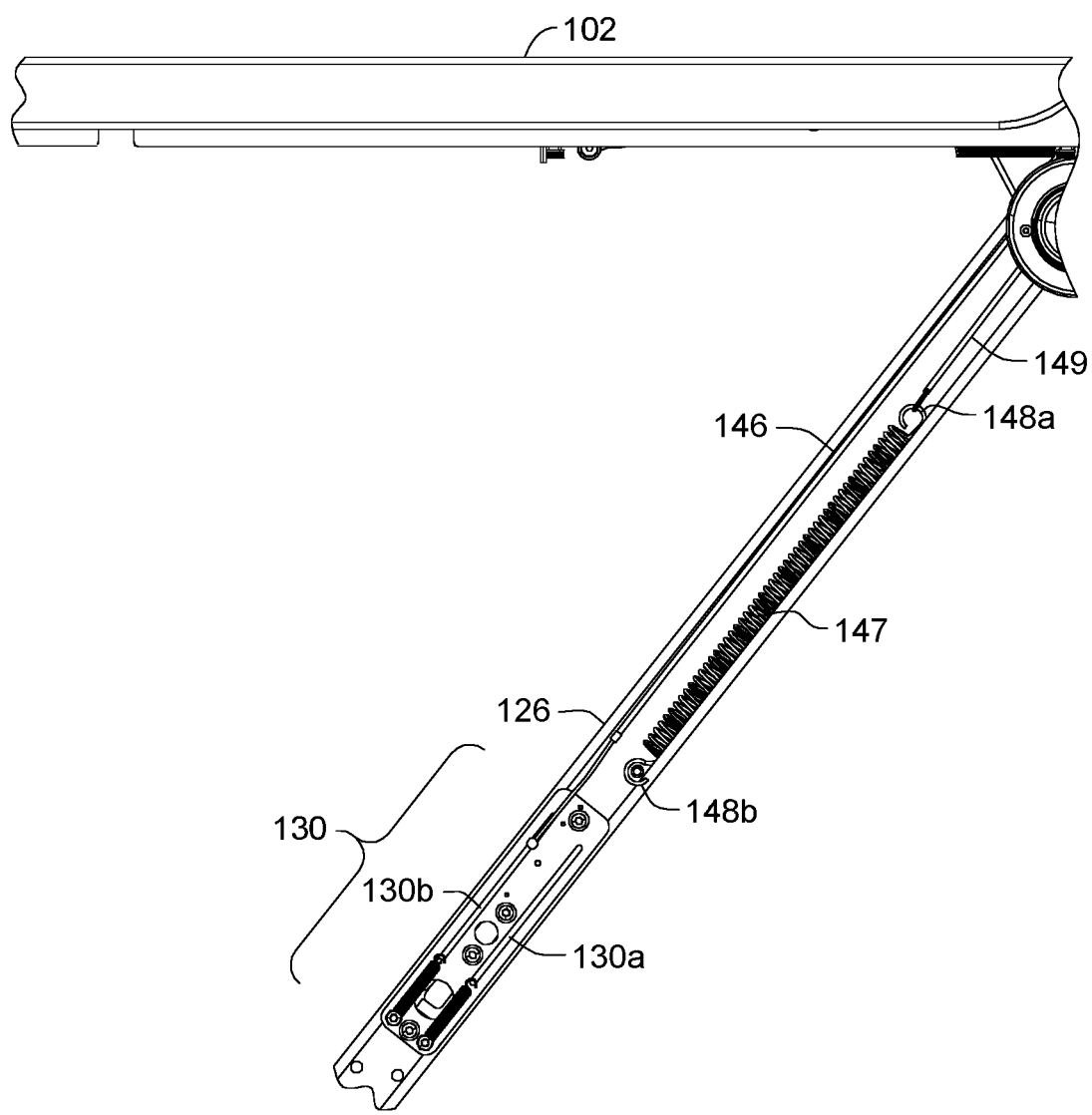
FIG. 14A is a side view of the rear leg having a rear leg release cable attached to the dual sliding linkage mechanism (DSLM) of the cart of the first embodiment and FIG. 14B is a perspective view of the dual sliding linkage mechanism.

FIG. 13 shows the operation of the dual sliding linkage mechanism (DSLM) 130 in detail. Rear leg lower tray linkage 132 and rear upper hinge pair linkage 134 are capable of operating independently, but the rear upper hinge pair linkage 134 cannot move until the rear leg lower tray linkage 132 travels past a locking lever 130c as shown in FIG. 14A. This ensures smooth load transition and balance as the rear leg 126 remains locked and supporting the load in conjunction with the guide wheels 116 until a substantial amount of the load weight is transferred onto the cargo storage deck. At this point, the operator is only supporting a fraction of the load of the cart 100 until it is fully transferred into the vehicle (as further described in detail below). The lower end of link 132 is connected to the lower hinge pair 140. The upper end of link 132 contains a rear leg lower tray link pivot (or locking) pin 132a which slides between a first link position 150 and a second link position 156 in a linear DSLM first track 130a. Pin 132a is locked at first link position 150 in first track 130a when the cart is in the open, expanded condition. Each pin 132a keeps lower hinge pair 140 in full open position to prevent the cart 100 from folding prematurely. When the rear leg release cable 146 is pulled, pin 132a slides in first track 130a to the second link position 156 where the cart 100 is in a starting to fold condition. As pin 132a moves towards position 156, lower hinge pair 140 can pivot upwards at lower hinge pair joint 140a and the front legs 118 of the cart 100 can begin to fold from their fully open position. The lower end of each pair of rear upper hinge pair linkage 134 is connected to upper hinge pair 144 and the upper end of link 134 contains a rear upper hinge pair linkage pivot (or locking pin) 134a which slides between a first link position 152 and second link position 160 in linear DSLM second track 130b. Each pin 134a is locked at first link position 152 in second track 130b when the cart is in the open, expanded condition. Each pin 134a keeps upper hinge pair 144 in full open position and prevents the cart 100 from folding. The locking lever 130c prevents the pin 134a from moving along the second track 130b until the lower hinge pair 140 has already gone through its folding movement and pin 132a has reached approximately 50% to 75% along the end of its movement in the first tracks toward position 156. As this happens, upper hinge pair 144 can start to fold at upper hinge pair joint 144a and the cart 100 can continue folding into a substantially flattened stated. By these means, the dual sliding linkage mechanism 130 insures that the upper hinge pair 144 will not fold prematurely. In this way, the folding movement of the cart 100 will not take place until the user has already stabilized the load into the vehicle cargo storage area using guide wheels 116.

Figure 14B:
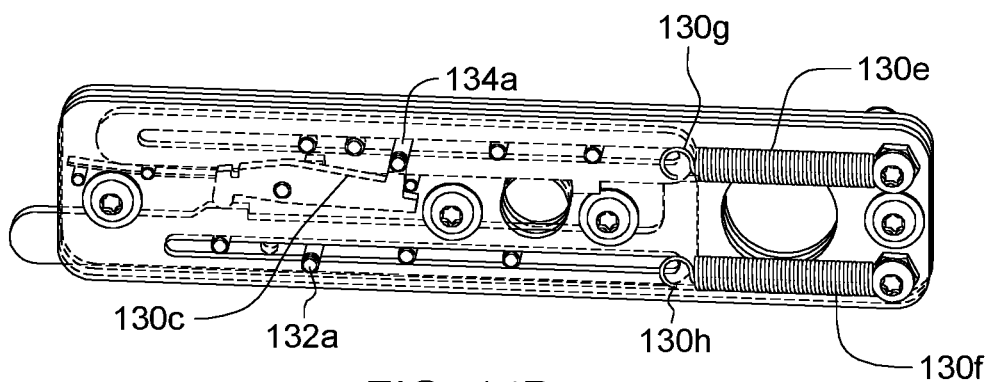

FIG. 14A is a side view of the rear leg release cable 146 attached to the dual sliding linkage mechanism 130. FIG. 14A shows in detail spring 147 in tension between the first rear leg spring attachment point 148a and second rear leg spring attachment point 148b. FIG. 14B is a perspective view of the DSLM 130 showing locking lever 130c and return springs 130e, 130f. Return springs 130e, 130f are attached to sliding (or carrier) arms 130g, 130h to reset the sliding elements to lock out when the Cart 100 is opened. Pin 132a is connected to link 132 with sliding arm 130h. Pin 134a is connected to link 134 with sliding arm 130g. Both sliding arms 130g, 130h are constrained to slide substantially linearly and the pins 132a, 134a limit the motion in first and second tracks 130a, 130b. The return springs 130e, 130f reset the pins 132a, 134a to home positions when the cart 100 is opened. Locking lever 130c is a pivoting locking element that is actuated by the cam surface on pin 130h. As previously discussed, until that locking lever 130c is activated by the cam surface on 130h, the sliding of pin 134a is prevented by a locking tab on locking lever 130c (shown as a rectangle on top corner of 130c). In addition, after unlocking, a hook on the back of pin 132a pushes pin 134a to initiate the folding of the upper hinge pair 144.

FIG. 15 is a perspective view of the underside of the cart 100 showing the wiring of the guide wheel cable 113 and rear leg release cable 146 throughout the cart 100.

Figure 16:
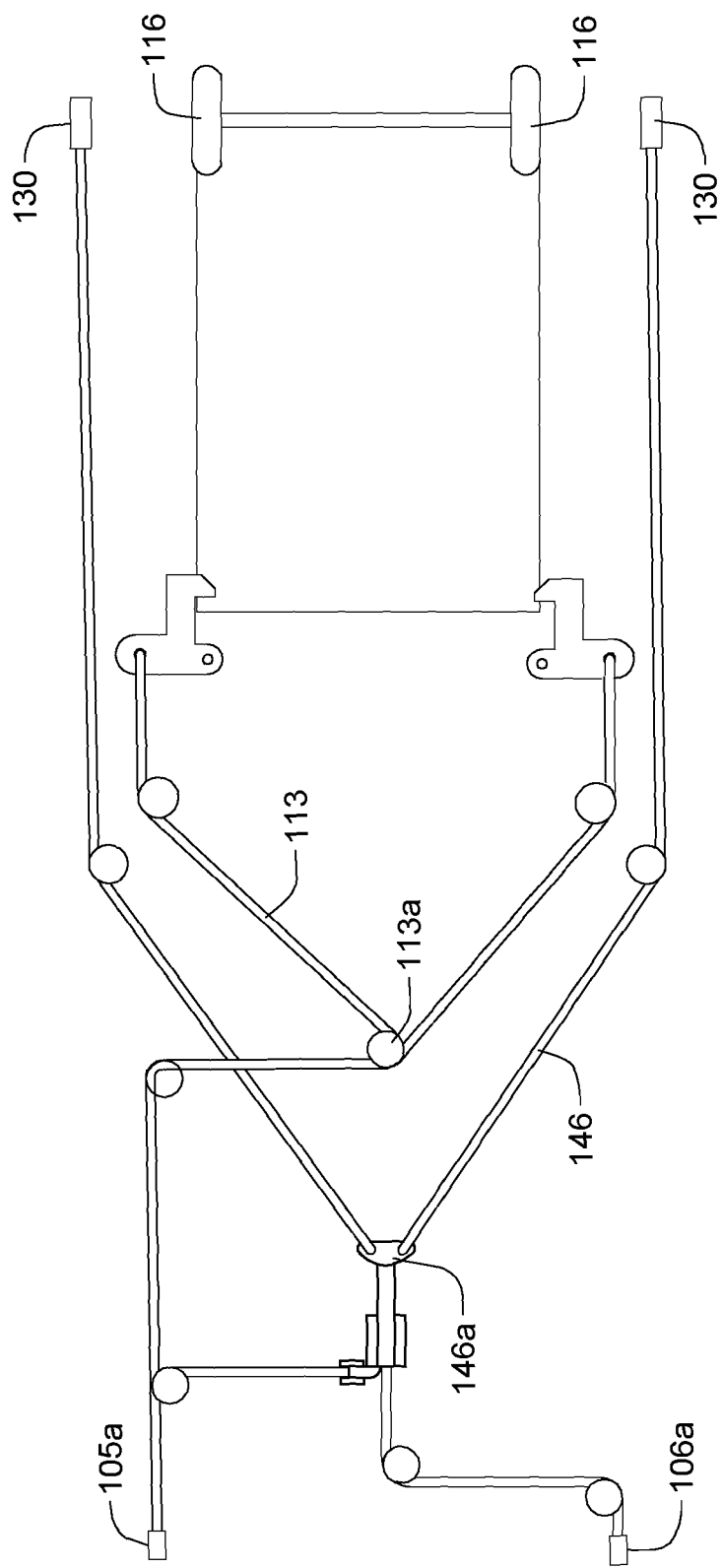
FIG. 16 is a schematic view of operation of the guide wheel cable and rear leg release cable which control operation of the cart.

FIG. 16 is schematic view of the bottom of the deck assembly that shows the wiring paths of the guide wheel cable 113 and rear leg release cable 146. Guide wheel cable 113 activates the guide wheels 116 by the pull of a guide wheel cable dual pull release 113a which simultaneously pulls and releases both pairs of guide wheels 116. Rear leg release cable 146 activates the folding of the rear legs 126 by pull of a rear leg release cable dual pull release 146a which is coupled to the pins 132a, 134a in DSLMs 130.

Note that in a typical embodiment the second control lever 106a which controls the folding of the rear legs 126 is configured to not release unless the first control lever 105a which controls the extension of the guide wheels is held "open".

Figure 10:
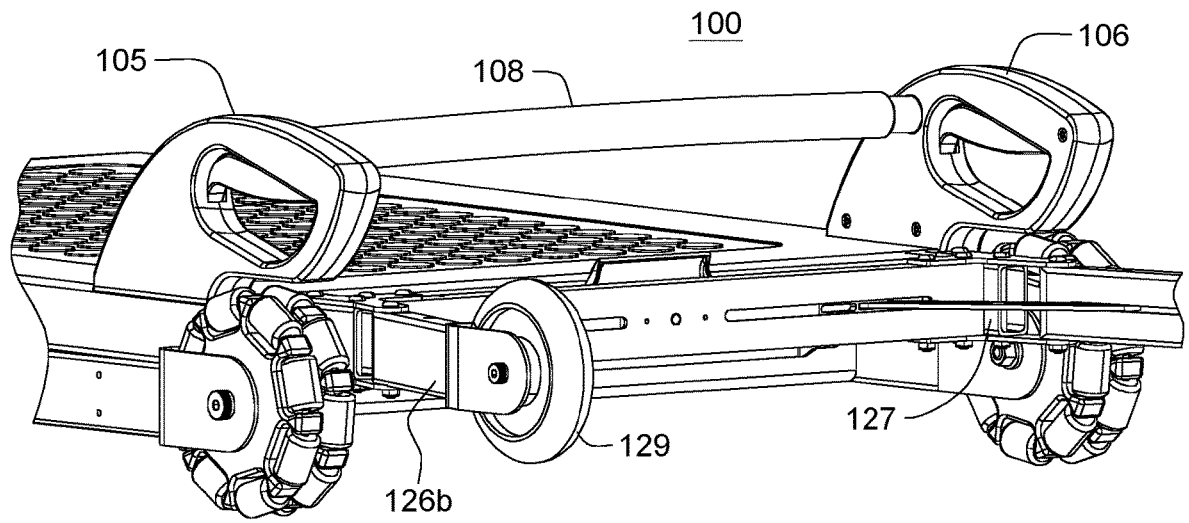
FIG. 10 is a perspective view of the rear leg lower extendible inserts of the first embodiment of the cart which are capable of bending into the compact cart for storage.
Figure 11:
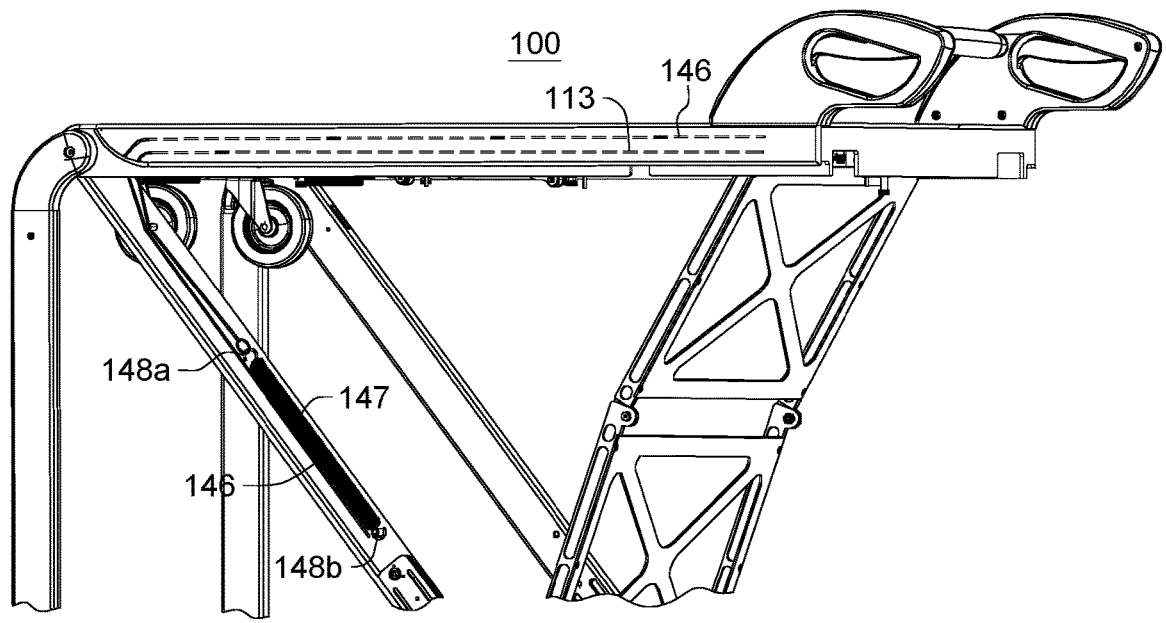
FIG. 11 is a cross-sectional perspective view of the first embodiment of the cart showing the spring mechanism located in the rear legs to provide a force to pull the rear legs towards the deck assembly when the cart is being folded up into a compact position.
Figure 12:
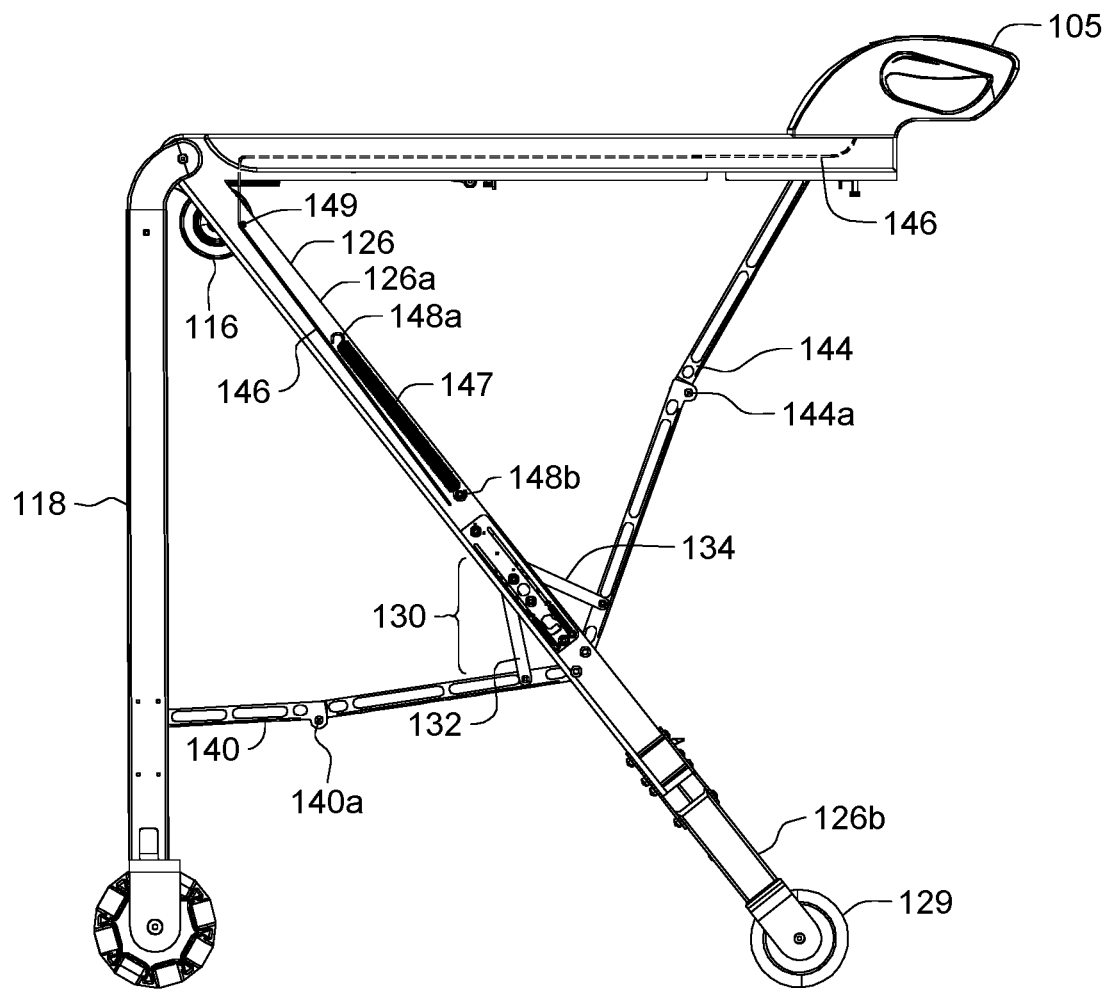
FIG. 12 is a cross-sectional side view of the cart of the first embodiment showing hidden details of the deck and rear leg.
Figure 17A:
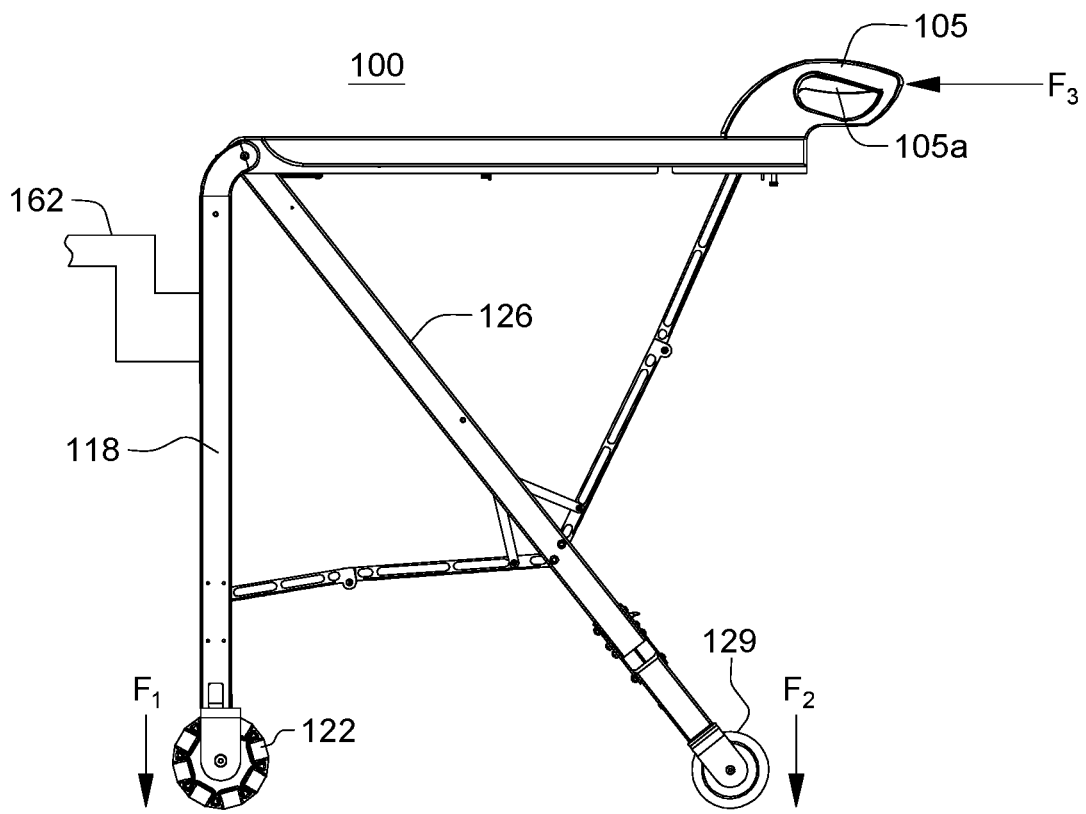
FIGS. 17A-17G show the cart of the first embodiment folding sequence and the forces acting thereon from an open position in FIG. 17A through various stages of folding to FIG. 17G when the cart is fully compact.
Figure 17B:
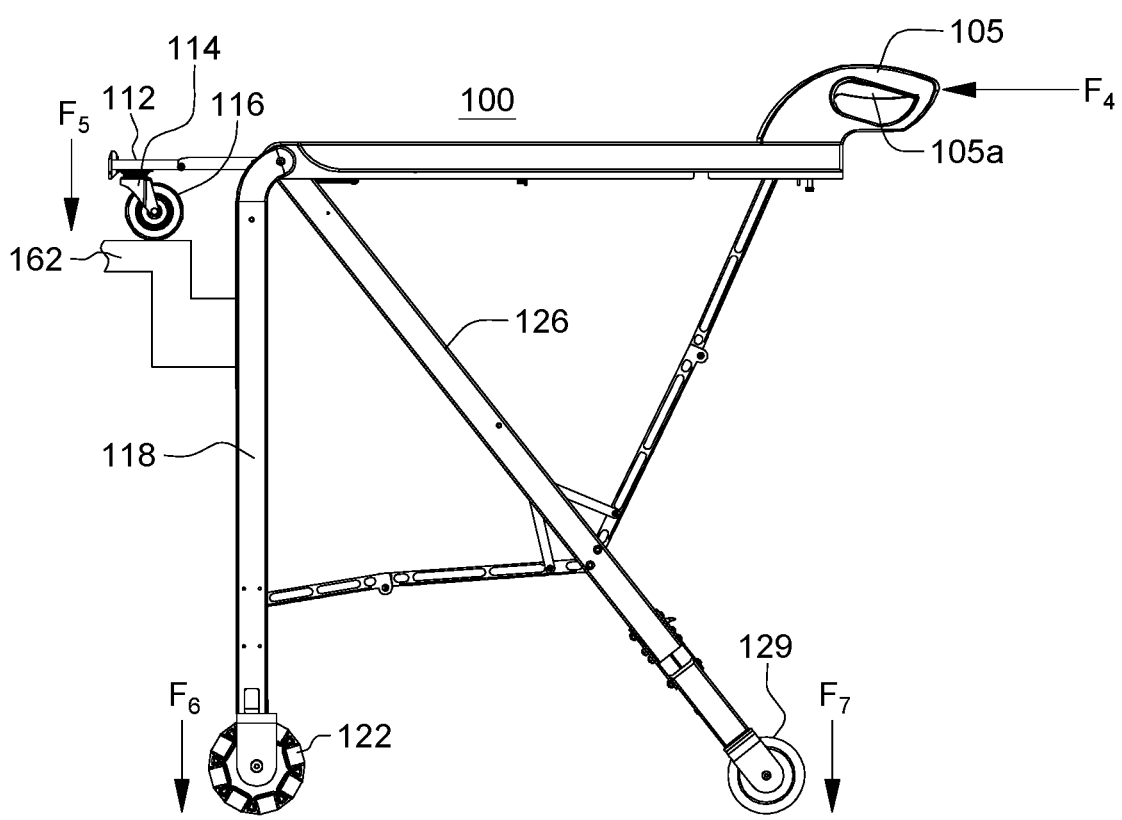
Figure 17C:
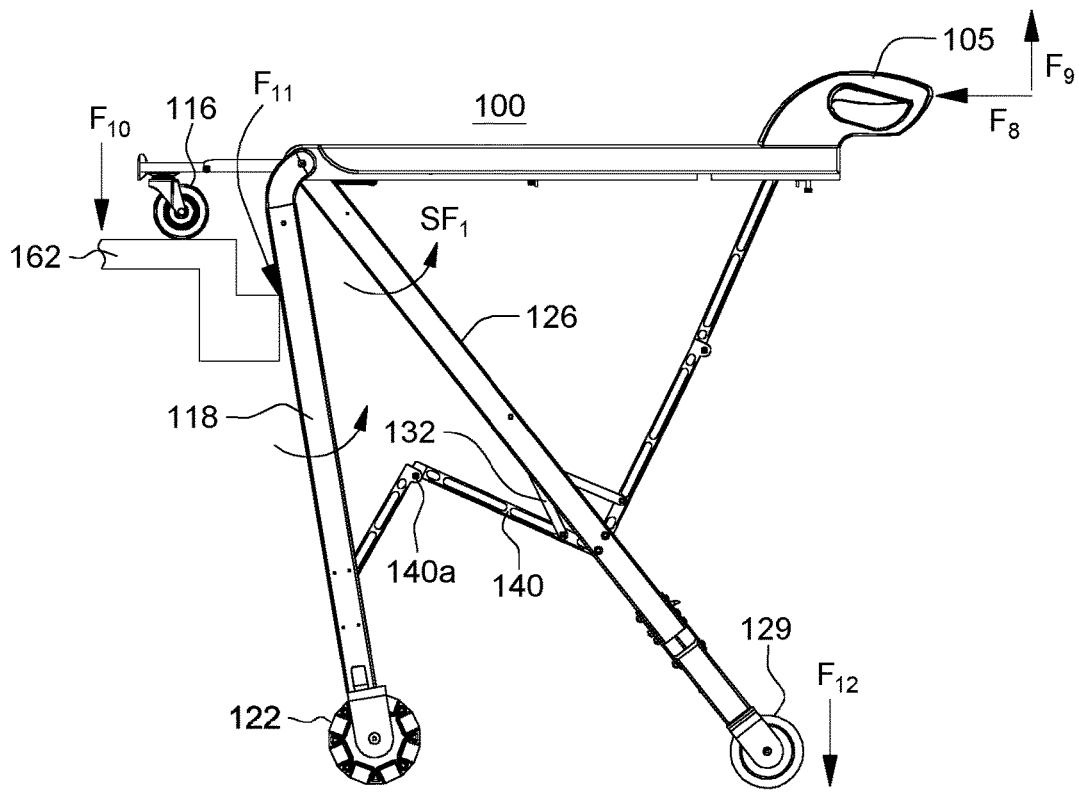
Figure 17D:
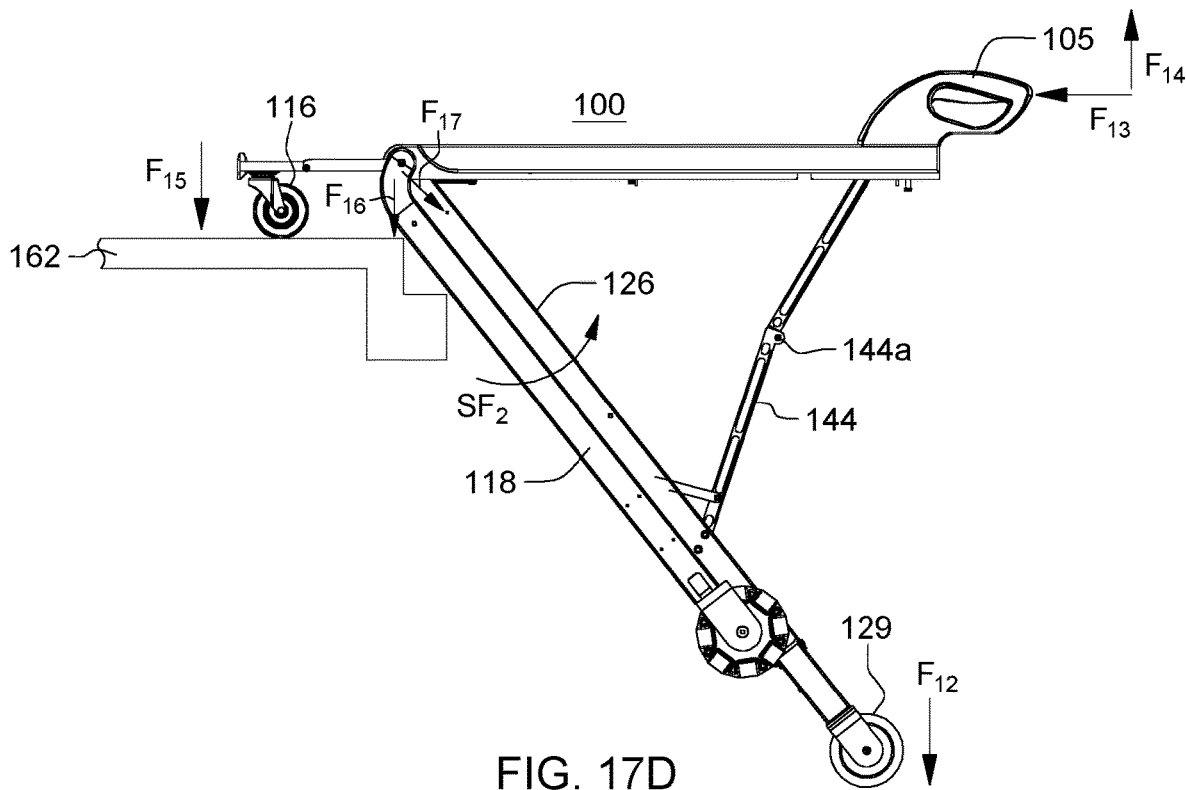
Figure 17E:
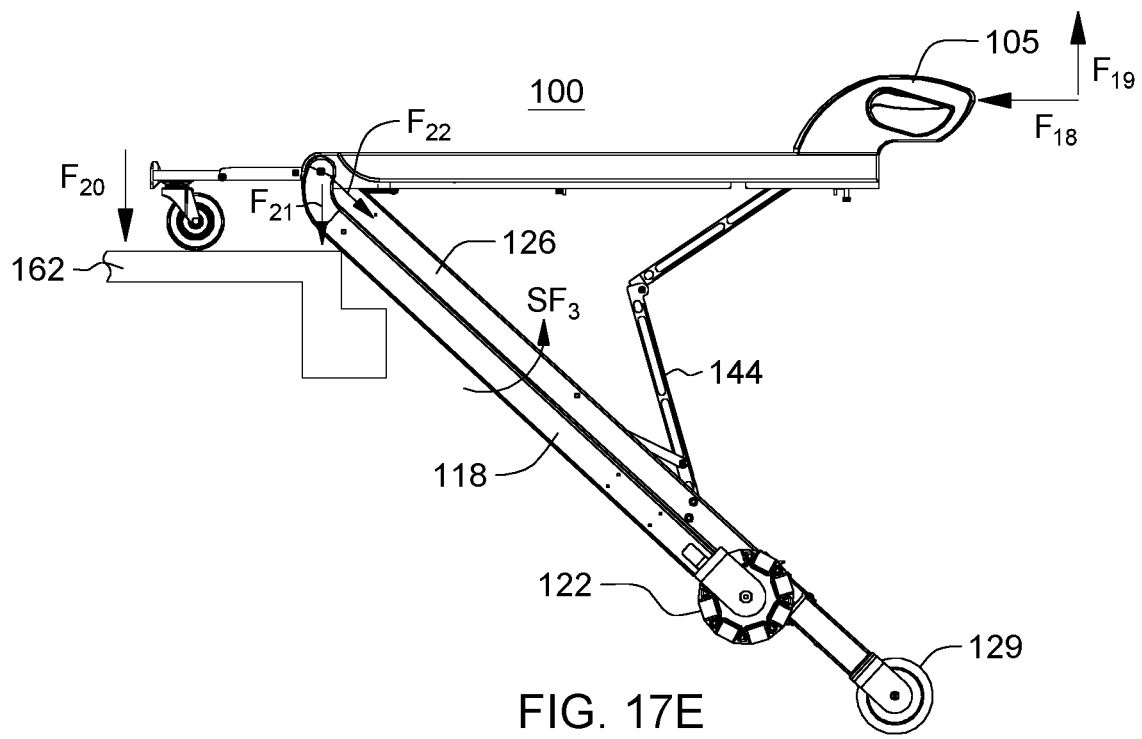
Figure 17F:
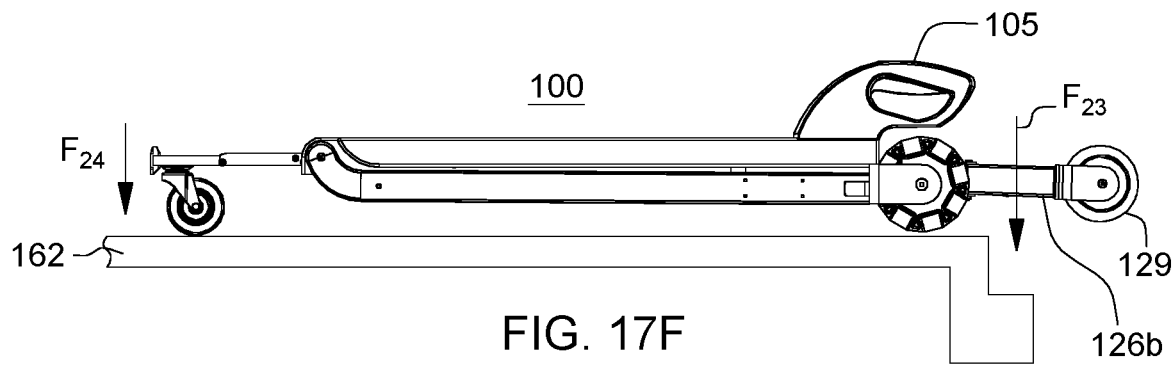
Figure 17G:
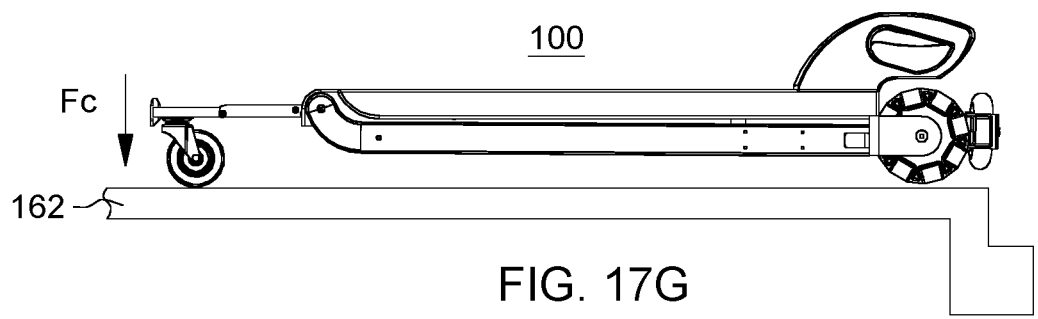

FIGS. 17A-17G show the cart folding sequence from a fully open position to a collapsed, compact position. In FIG. 17A, the cart 100 is open and erect and sitting on the ground abutting the rear bumper of a vehicle 162. The forces or loads on the cart 100, vehicle and operator will be described by referring to the cart 100 by the angle of the front legs 118 to the ground (which typically will be about 90 degrees). Forces $F_1$ (approximately 50% of the weight of the cart with the load included (W)) and $F_2$ (also approximately 50% W) are vertical forces wherein the front wheels 122 and rear wheels 129 are supporting the weight of the cart 100. At 90 degrees the front wheels and rear wheels are roughly splitting the weight of the cart and the load. $F_3$ is a horizontal force applied by the operator to the handles 105 and 106 to push the cart 100 against the vehicle 162, but there should be none or very little force by the operator in the vertical direction. To start the folding routine, the operator squeezes the first control lever 105a of handle 105 to eject and extend the guide wheels 116 as shown in FIG. 17B. The guide wheel axle assembly 114 and extendible guide wheel roller plates 112 allow the operator to stabilize the load on the deck 102 with the vehicle cargo platform surface. The operator then pushes the cart 100 using force $F_4$ until the guide wheels 116 are resting (i.e., applying force $F_5$) on the cargo area or trunk of vehicle 162. Wheels 122 and 129 are applying forces $F_6$ and $F_7$ towards the ground. As shown in FIG. 17C (approximately 10 to 20% degrees from vertical of the front legs 118), once the guide wheels 116 are extended, the operator may continue to apply horizontal force F and vertical force $F_9$ (approximately 10% W) and then squeeze second control lever 106a on handle 106 (not seen in FIG. 17C) to start the folding routine of the cart 100. As discussed above, the second control lever 106a applies a force to the dual sliding linkage mechanism 130. Specifically, the second control lever 106a applies a force through cable 146 to pull pin 132a of rear leg lower tray linkage 132 that causes the lower hinge pair 140 to start folding as shown in FIG. 17C. This causes the rear leg 126 to unlock and allows two members—rear leg lower tray link pivot (or locking) pin 132a and then rear leg stabilizer brace link pivot (or locking) pin 134a—to slide axially in DSLM tracks 130a, 130b within the dual sliding linkage mechanism 130. Spring force SF1 pulls the rear leg 126 upward. As shown in FIG. 17C, pushing the cart 100 into the vehicle continues the folding action, as the front leg 118 in contact with the rear bumper of the vehicle is pushed back causing the lower hinge pair 140 to fold about lower hinge pair joint 140a. The upper portion of the front leg in contact with the vehicle at this point is starting to bear the weight of the load as well. During this stage, the cart 100 is primarily supported by guide wheels 116, upper portion of the front legs 118, and rear wheels 129 and applies forces $F_{10}$ (approximately 40-50% W), $F_{11}$ (approximately 10-20% W), and $F_{12}$ (approximately 40-50% W). Front wheels 122 are carrying either no weight or very little weight at this point. In FIG. 17D, as the operator applies horizontal force $F_{13}$ and vertical force $F_{14}$ (approximately 30-40% W) the front leg 118 is braced against the rear leg 126 while the upper hinge pair 144 starts folding about upper hinge pair joint 144a. Spring force SF2 continues to pull the rear leg 126 upward. The cart 100 applies forces $F_{15}$ (approximately 0-10% W) through guide wheels 116 and $F_{16}$ (approximately 50-60% W) and $F_{17}$ (approximately 0-10% W) forces through the front legs 118, and $F_{18}$ through the rear wheels 129. Continued insertion into the vehicle 162 from the operator by applying horizontal force $F_{18}$ folds the upper hinge pair 144 as shown in FIG. 17E. The operator also applies vertical force $F_{19}$ (approximately 20-30% W) to lift the cart 100 into the vehicle 162 as well. The cart 100 applies downward forces $F_{20}$ (approximately 0-10% W) and $F_{21}$ and $F_{22}$ combine for approximately 70 to 80% W. The process continues as the front legs 118, rear legs 126 and all associated elements are fully folded until collapsed as shown in FIG. 17F. The cart 100 then applies forces $F_{23}$ (approximately 50% W) and $F_{24}$ (approximately 50% W) onto the vehicle. To permit further consolidation of space, the rear leg lower extendible inserts (or swing legs) 126b can be bended and stowed as illustrated by FIG. 17G. The rear leg lower extendible inserts 126b can slide along rear leg hinge 127 as shown in FIG. 10 to make the folded cart 100 more compact. The folding or pivot of rear leg lower extendible inserts 126b can be manual or automatic.

Upon reaching the next intended destination, the hatch/trunk lid/gate of the vehicle 162 is opened and the cart 100 and load 104 are extracted in reverse order. The operator will extend out the rear leg extendible inserts (or swing legs) 126b to an open and locked position. Next the operator will grasp the ergonomic hand grips 105, 106 or crossbar 108 and begin pulling the cart 100 out from the rear of the vehicle. The operator is typically supporting one end and the guide wheels 116 will support the other through rolling contact on the vehicle storage cargo area. As the front legs 118, rear legs 126, wheels 122, and wheels 129 extend beyond (or clear) the storage area and bumper they will preferably deploy automatically by gravity and "lock" into full, upright and secure position for easy maneuverability to the next location.

The height of the cart's deck 102 surface from the ground can be varied with adjustment to the lengths and positions of the legs 118, 126. Preferably in order to accommodate varying vehicle deck surface heights, the legs 118, 126 of the collapsible cart 100 can be adjusted up or down to position easily for rolling directly onto and into the vehicle's rear storage compartment (trunk or truck bed). In order to accommodate the varying heights of the rear cargo deck across automobile makes and models, the front and rear leg lengths can be adjusted manually by adjusting front leg inserts 120 and rear lower leg extension inserts 126b. Typically set once for use with a specific automobile, the front leg inserts 120 and rear leg extendible inserts 126b can be extended or shortened to match the ground to top of cargo deck height. The legs and other linkage parts may be made from extruded aluminum tube, chromoly, steel, or similar material, with the leg extensions telescoping from them manually and set via detents, set screws or various other means of securing them. The cart's 100 unique construction allows for minimum number of linkages, and other parts for light weight and economical manufacture, and ensuring strong and sturdy load handling.

Figure 18A:
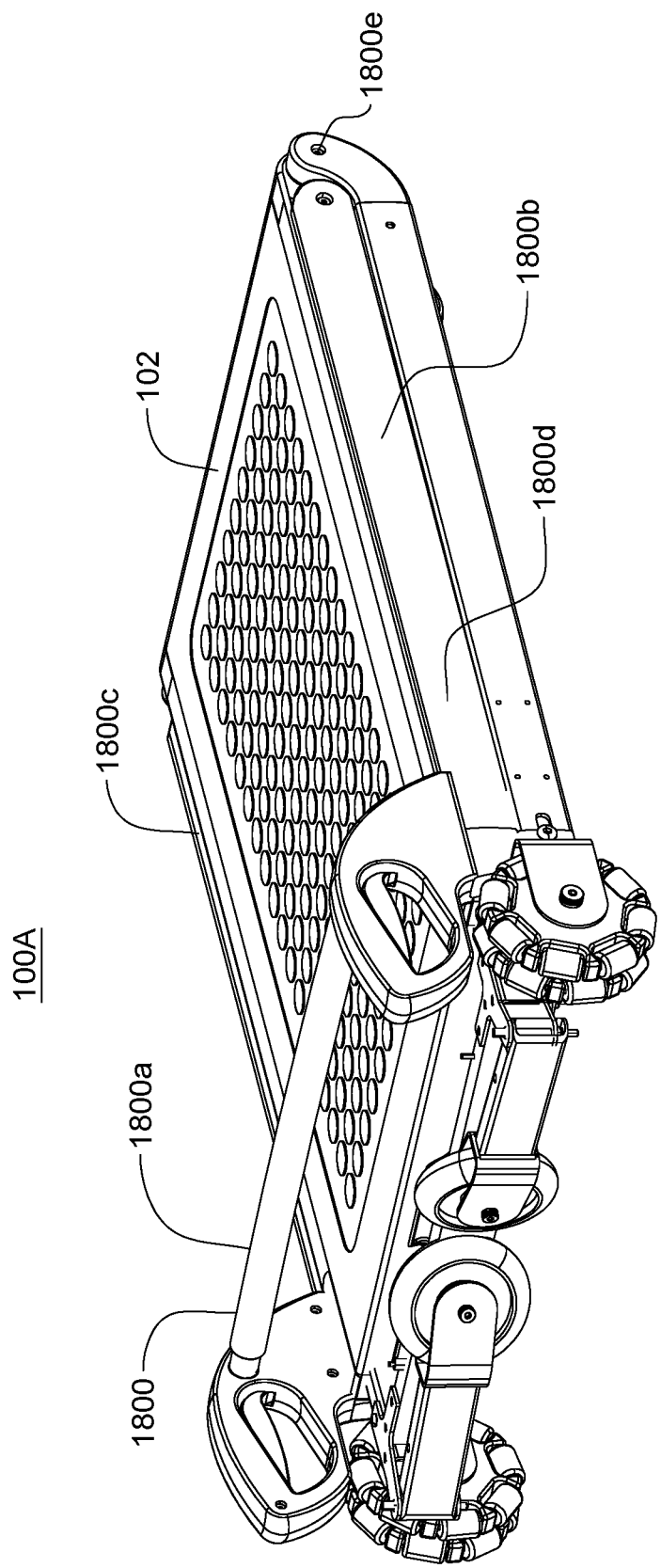
FIGS. 18A-18B show a second embodiment of the cart in a lowboy configuration with ergonomic handles.
Figure 18B:
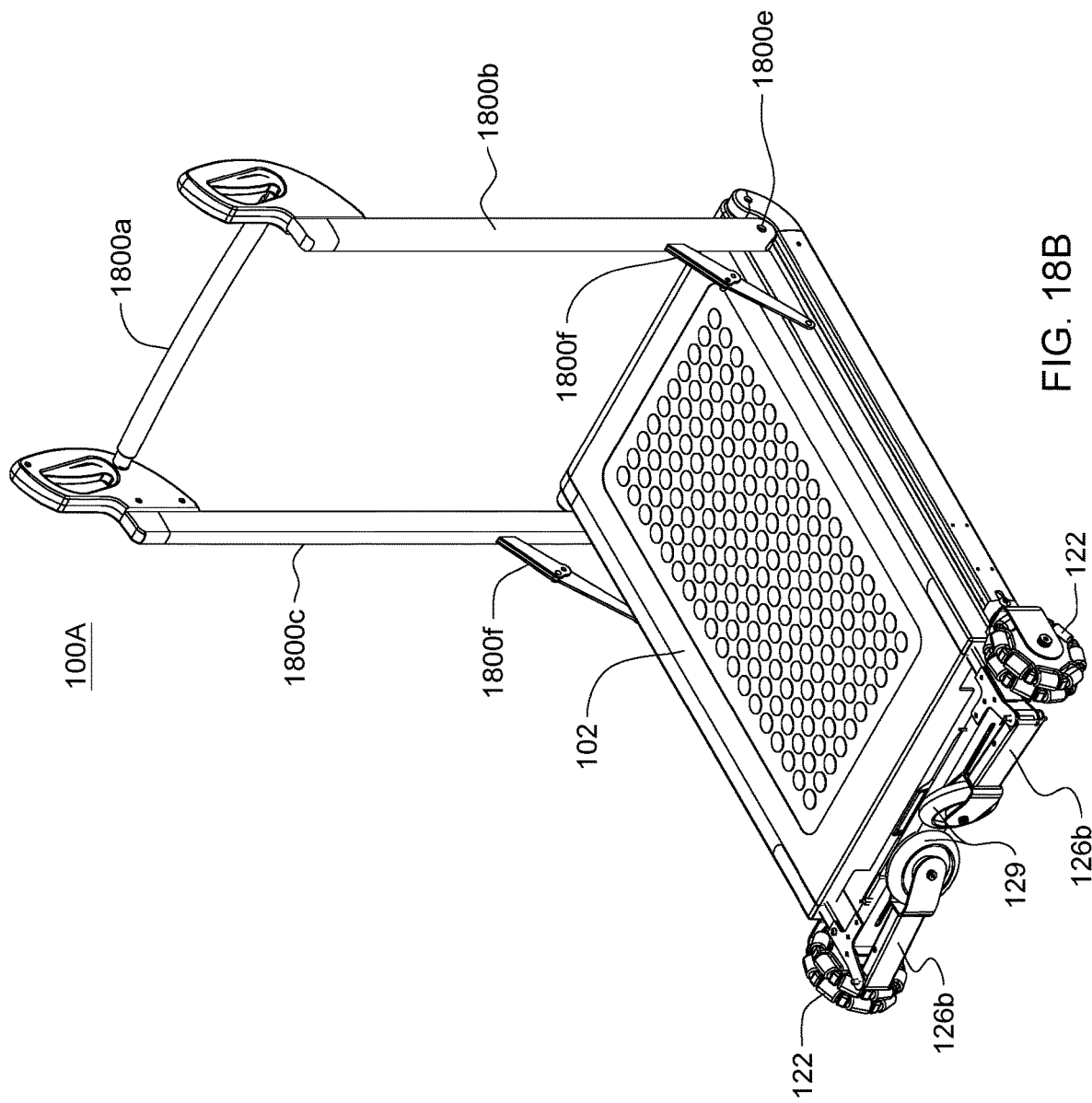

FIGS. 18A-18B show the second embodiment of the cart 100A with dual sliding linkage mechanism 130. The second embodiment is similar in operation to the first embodiment and like reference numerals refer to the same elements associated with the first embodiment of the cart 100. The second embodiment cart 100A has an alternative handle 1800 to the handle of the first embodiment cart 100. Handle 1800 has a crossbar 1800a with supporting arms 1800b, 1800c that can swing up to convert the cart 100A from folded mode to lowboy mode. As shown in FIG. 18A the cart 100A is in a fully folded and stowed position where it can act as a "mechanic's creeper". FIG. 18B shows the cart 100A converted into a low boy trolley. This conversion can be accomplished by manually pulling out spring loaded plunger pins 1800*d* on either side of the handle 1800 that lock the handle to the deck 102. Once the pins are pulled back the handle crossbar 1800*a* can be raised on connectors 1800*f* and locked to a position substantially ninety degrees (or more) by an over-centered hinge 1800*e* which connects it to the deck 102 at its forward end. The handle 1800 can then be returned to its down position alongside the deck 102 by simply pulling the hinge 1800*e* beyond its over-centered position allowing it and connectors 1800*e* to buckle, and when the handle 1800 reaches its home position the spring loaded plunger pins 1800*d* are reinserted to again secure it to the deck 102 for upright use.

The open cart can be manually collapsed into a lowboy trolley cart 100A as shown in FIG. 18A by tilting the cart 100A forward to allow it to rest on the front edge of the deck 102, which is the also the front surface of the guide wheel assembly in its fully retracted position. From this position the user can manually push in the lower hinge pair 140 and then the upper hinge pair 144 allowing the cart to sit on the ground in its fully collapsed position. The lower rear leg section 126*b* (i.e., rear swing legs) can then be manually folded back in for compactness. In this fully collapsed position with handle 108 still stowed along the side of the deck 102, the cart 100A, as discussed above, can then be used as a mechanic's creeper to easily move about underneath a supported vehicle.

Figure 19A:
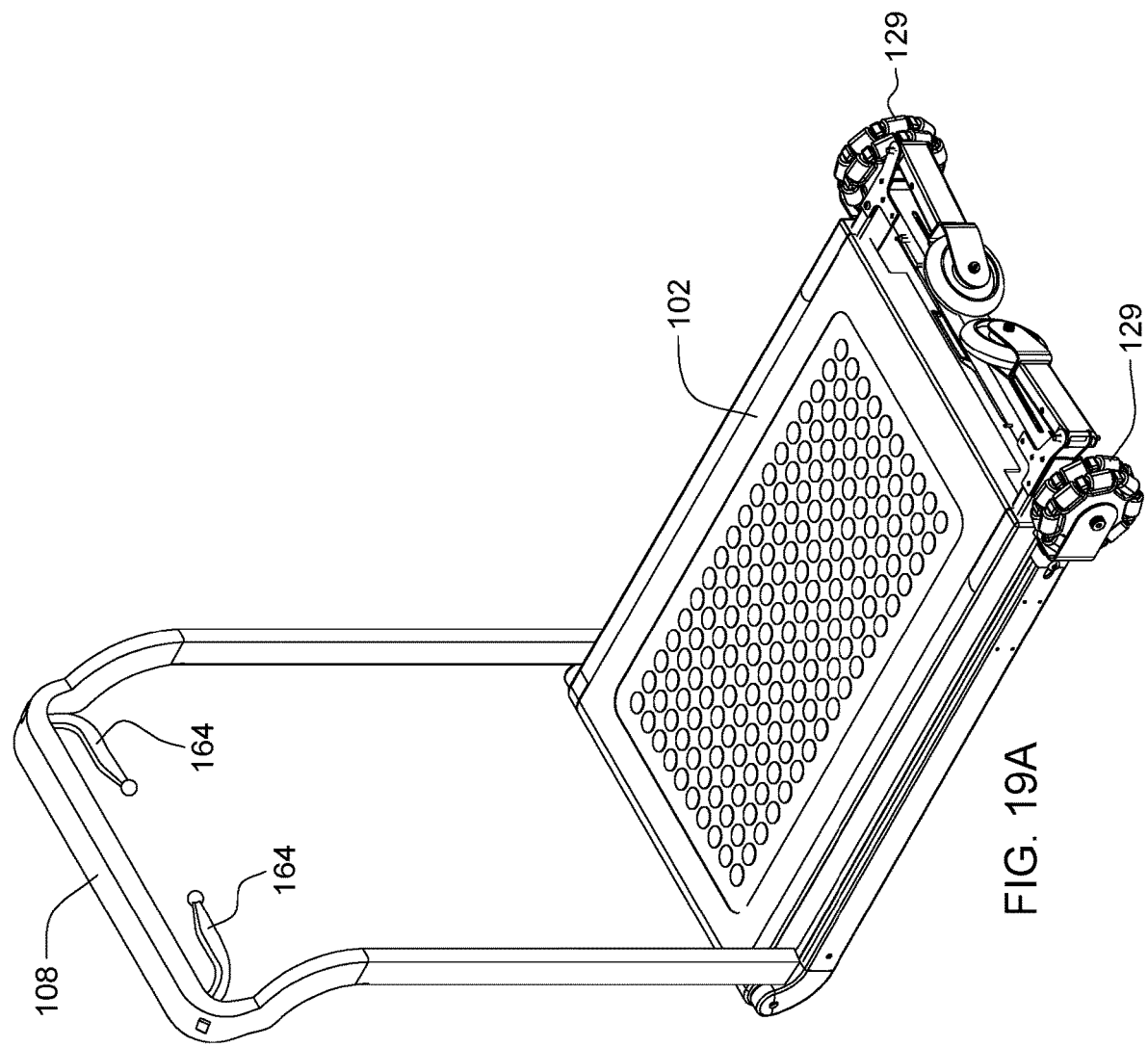
FIGS. 19A and 19B show a third embodiment of the cart in a lowboy configuration with bicycle handles.
Figure 19B:
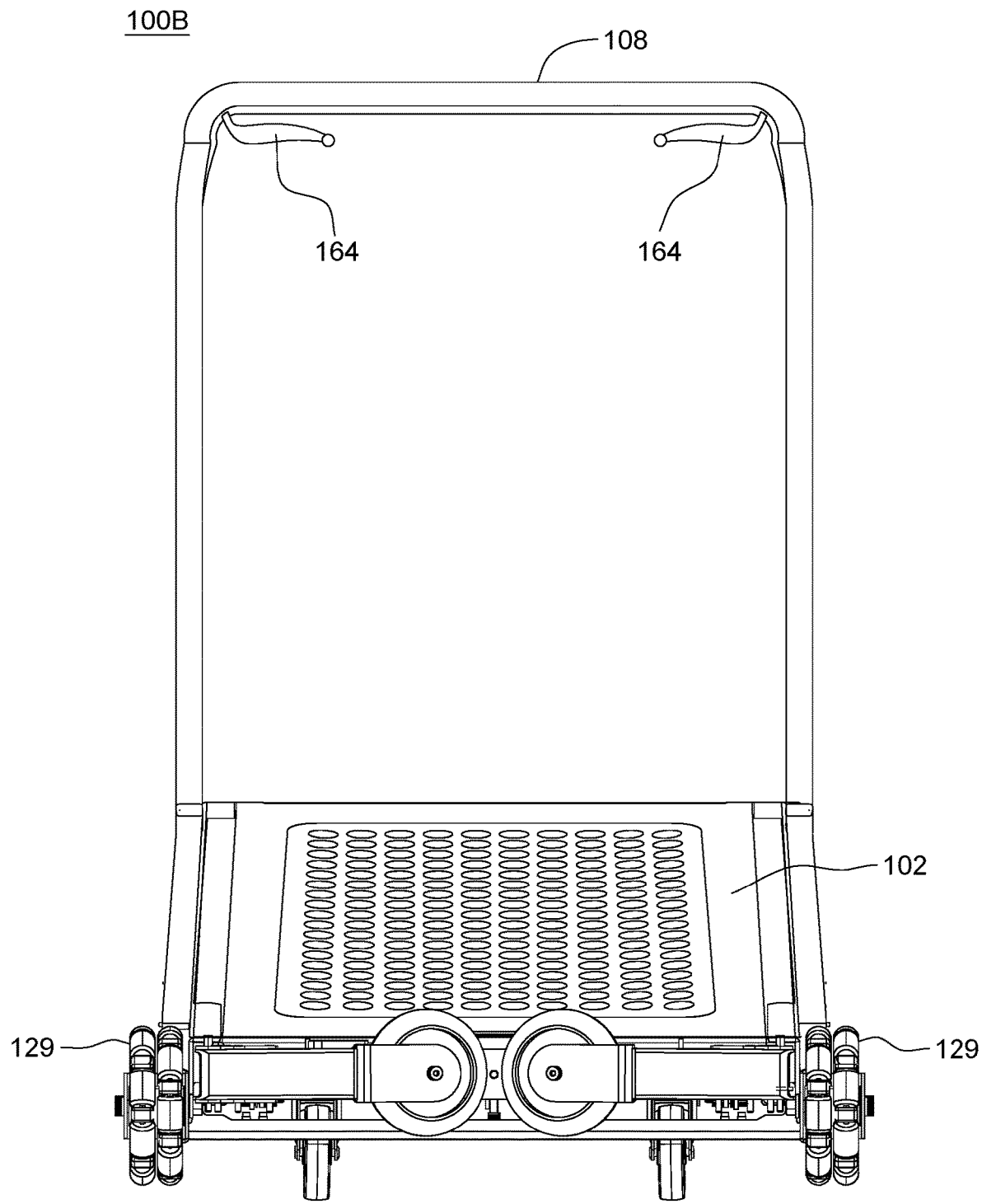

FIGS. 19A and 19B show the third embodiment of the cart 100B with dual sliding linkage mechanism and a handle with a crossbar 108 with controls 164 in (or on) the crossbar for deploying guide wheels 116 and allow for folding. The controls 164 may be, for example, bicycle type controls. The handle 108 is able to fold up ninety degrees plus to allow lowboy operation. The third embodiment is similar in operation to the first and second embodiments and like reference numerals refer to the same elements associated with those embodiments. This lowboy configuration is convenient for transporting heavier loads low to the ground.

Figure 20A:
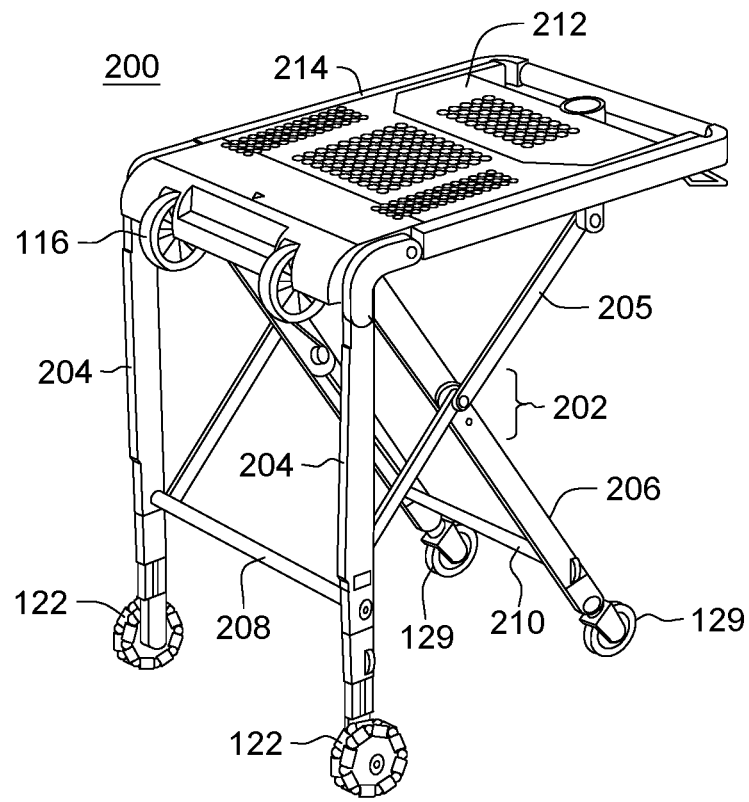
FIG. 20A is a perspective view of a fourth embodiment of the cart of the present disclosure.
Figure 20B:
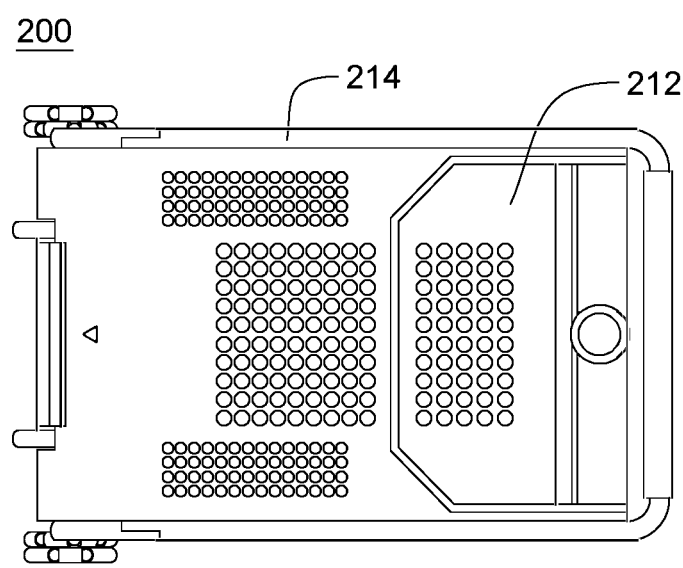
FIG. 20B is a top view of the cart of the fourth embodiment.
Figure 20C:
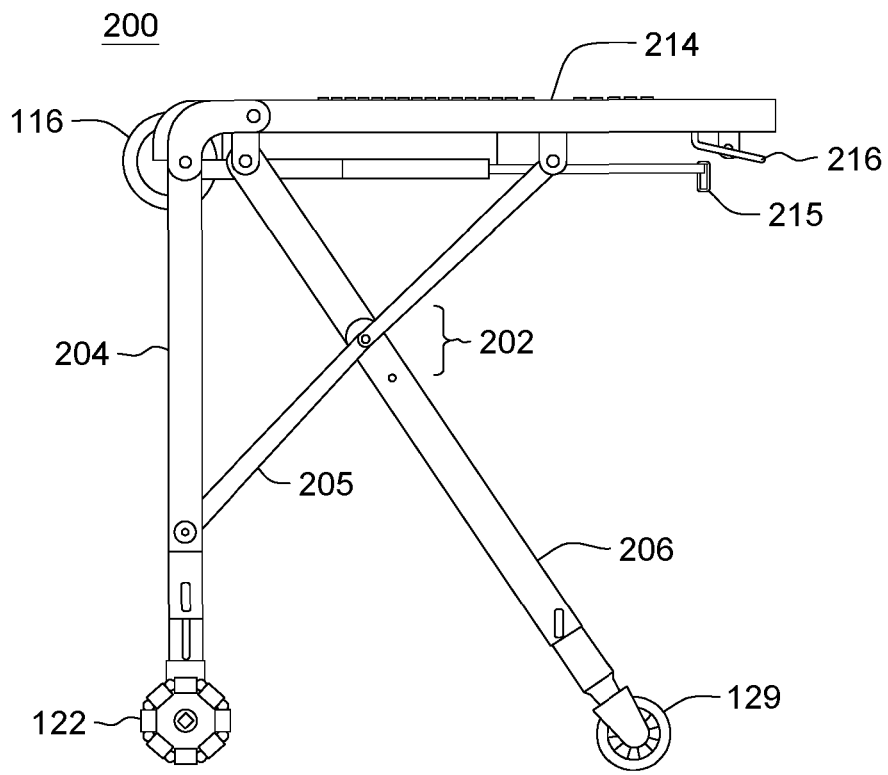
FIG. 20C is a side view of the cart of the fourth embodiment.
Figure 20D:
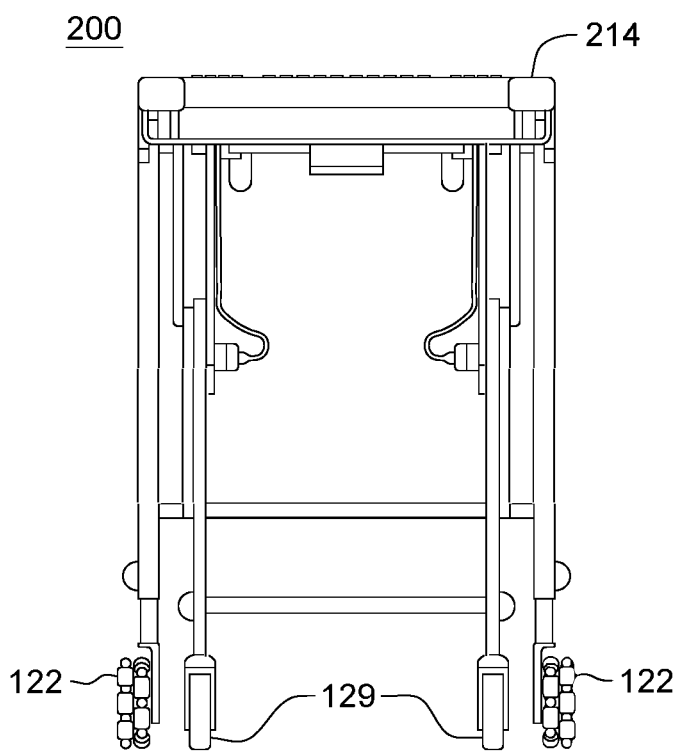
FIG. 20D is a rear operator view of the cart of the fourth embodiment.

FIGS. 20A-20D show a perspective view, top view, side view and rear (or operator) view, respectively, of the fourth embodiment of the folding cart labeled 200. The fourth embodiment is similar in operation to the first through third embodiments and like reference numerals refer to the same elements associated with those embodiments. FIG. 20A shows cart 200 in a perspective view fully opened up. Cart 200 has a different folding mechanism 202 than the dual sliding linkage mechanism 130 of the first, second and third embodiments. The folding mechanism 202 of the front leg 204, middle support 205, and rear leg 206 in the cart 200 is a sliding bearing 202*a* inside the rear diagonal legs 206 (as shown in detail in FIGS. 21C and 21D). Front legs 204 are supported by a front leg brace 208 and rear legs 206 are supported by a rear leg brace 210. The fourth embodiment also features an integrated fold-out toe plate 212 in the deck 214. The fourth embodiment has a similar control system as the first embodiment 100. The guide wheels 116 are typically first extended by sliding first lever 215 to the side. Then second control lever 216 can be lifted to unlock the lower middle support 205A and upper middle support 206A. These supports 205A, 205B force the front legs to sweep back. In this embodiment 200 the operator typically has to support more load than the first embodiment 100 as the cart 200 rolls into the cargo area of a vehicle.

Figure 21A:
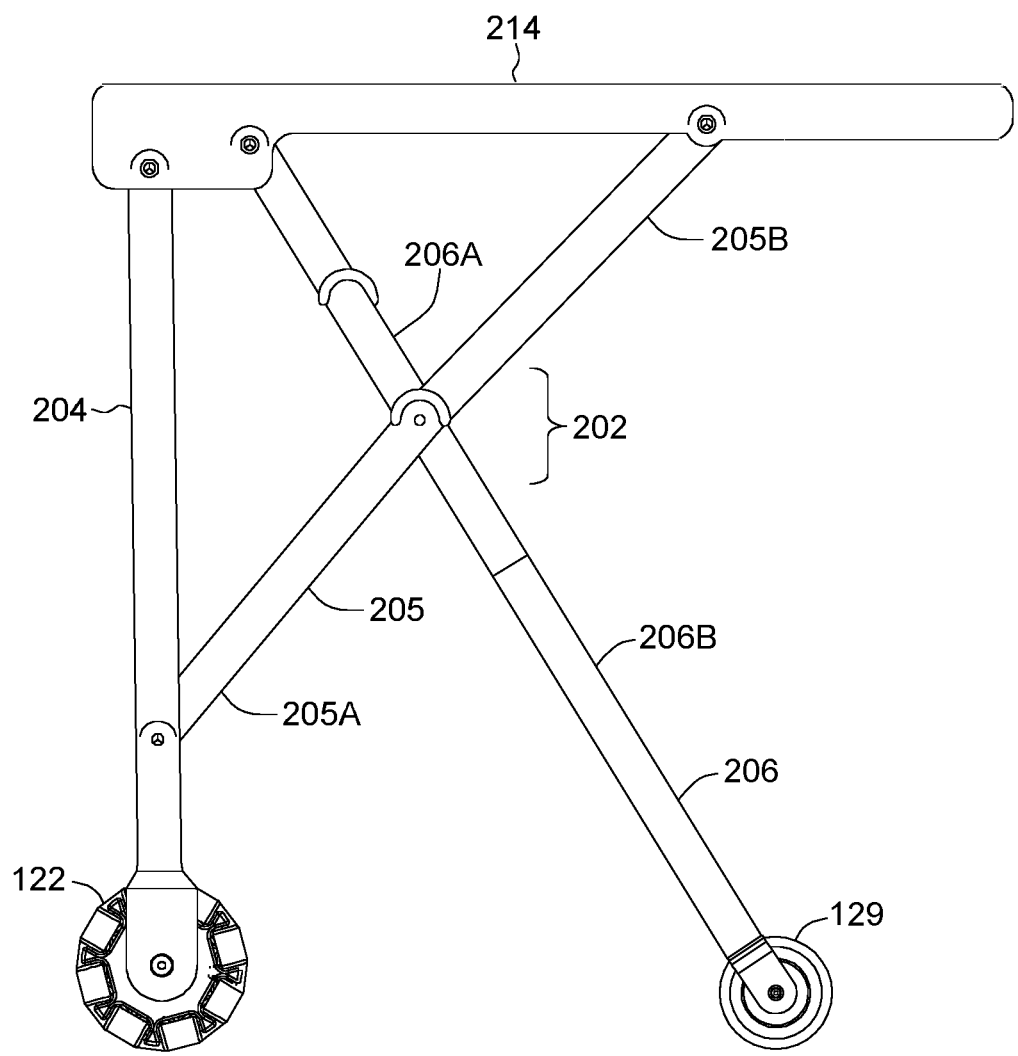
FIG. 21A is a side view of the cart of the fourth embodiment in an open position.

FIG. 21A is a side view of the fourth embodiment in an open position.

Figure 21B:
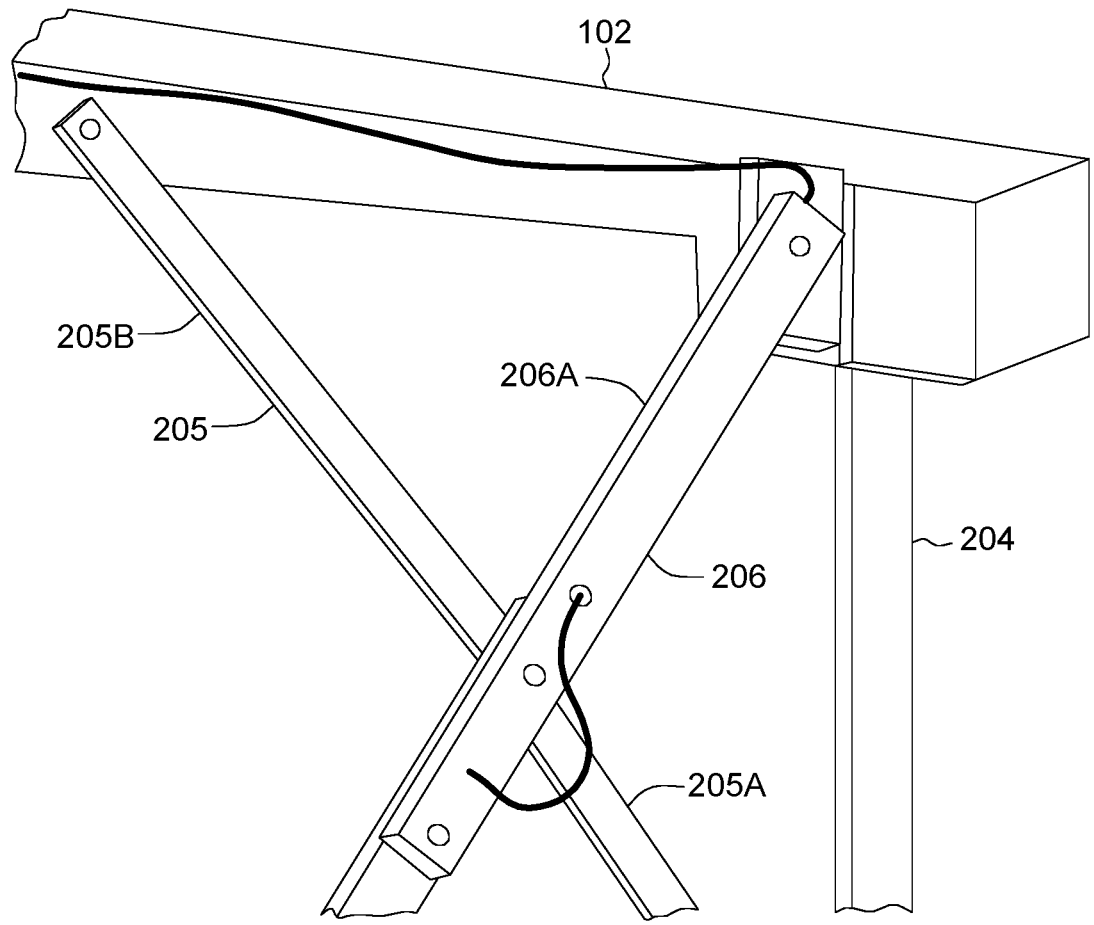
FIG. 21B is a cross-sectional perspective view of the cart of the fourth embodiment from the rear.

FIG. 21B is a cross-sectional perspective view of the cart 200 from rear.

Figure 21C:
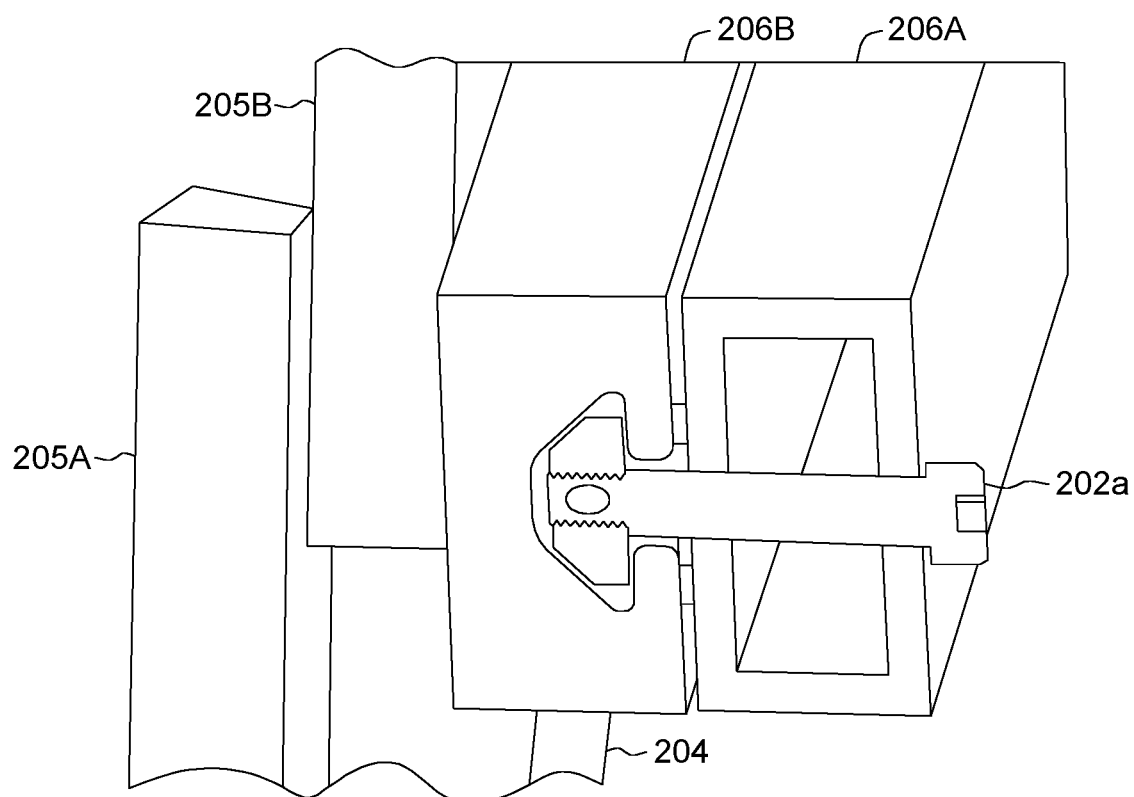
FIG. 21C is a perspective of the folding mechanism of the cart of the fourth embodiment.

FIG. 21C is a perspective of the folding mechanism of the cart 200.

Figure 21D:
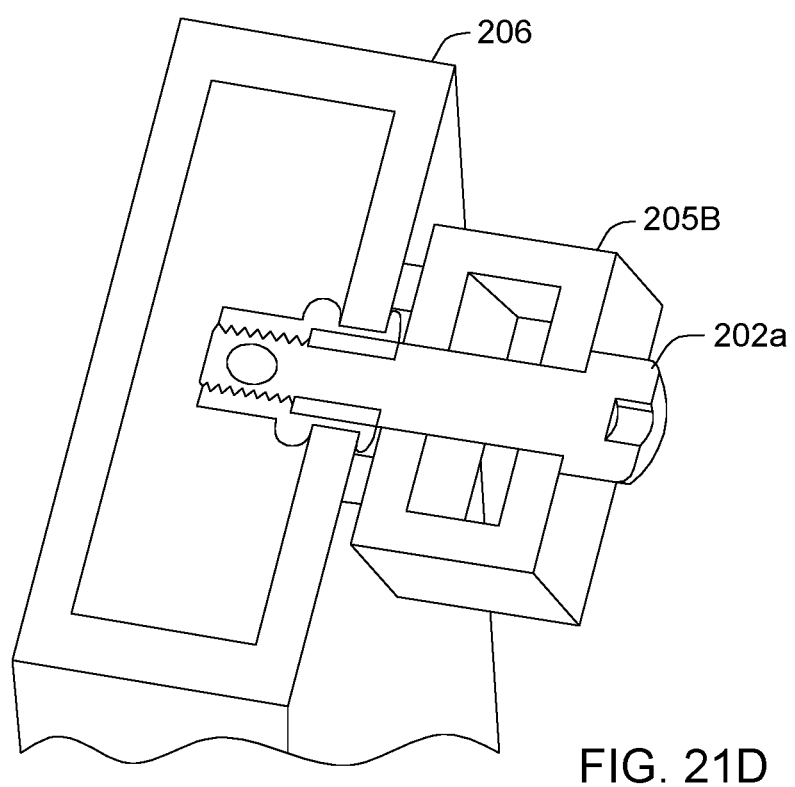
FIG. 21D is a perspective of the joint where the front leg and middle support are connected in the cart of the fourth embodiment.
Figure 22A:
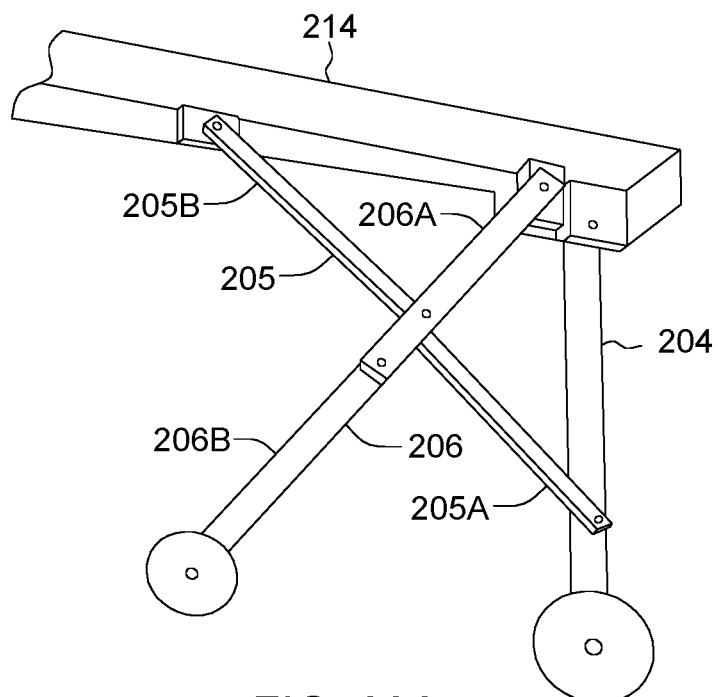
FIGS. 22A-22E show the cart of the fourth embodiment in various stages of folding from an open position in FIG. 22A to a compact position in FIG. 22E.
Figure 22B:
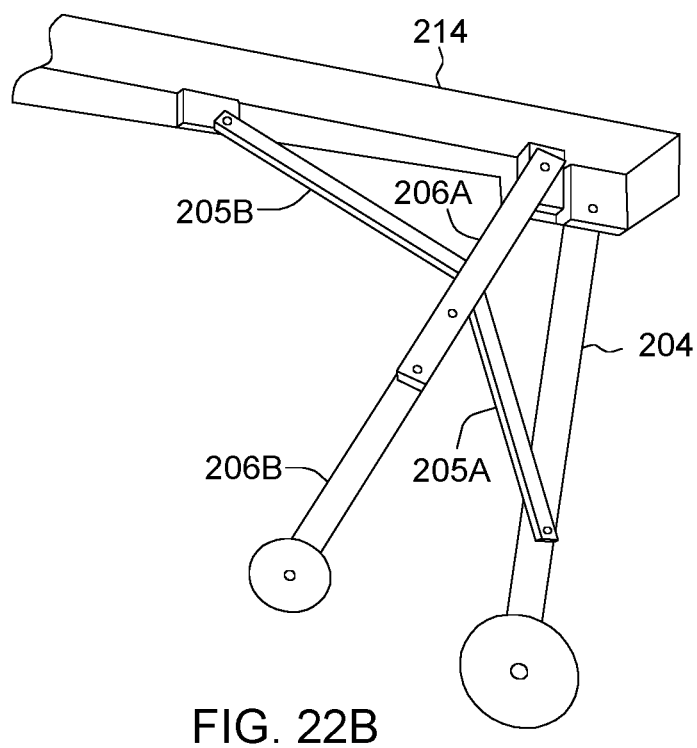
Figure 22C:
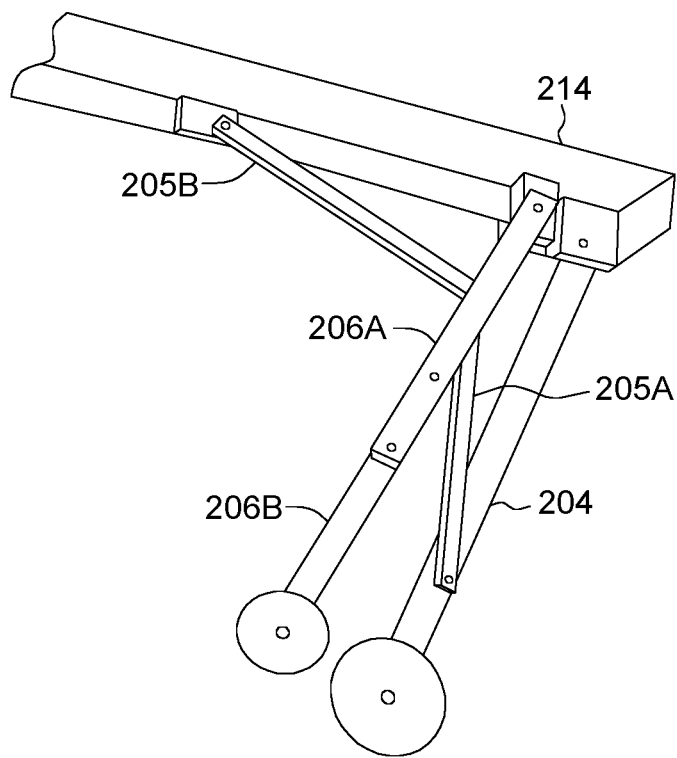
Figure 22D:
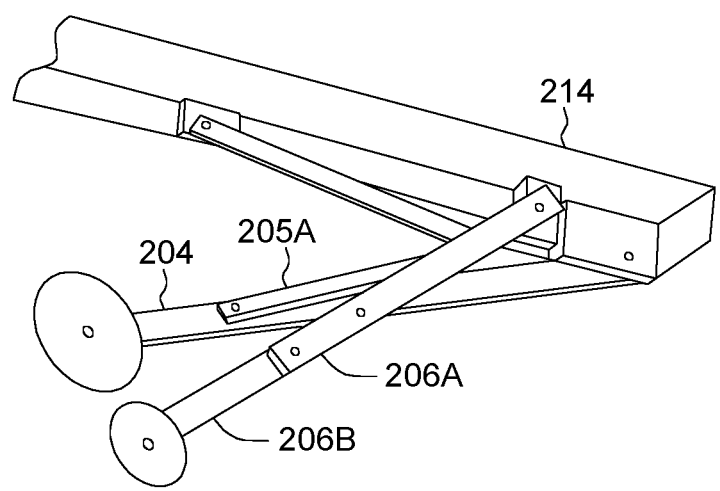
Figure 22E:
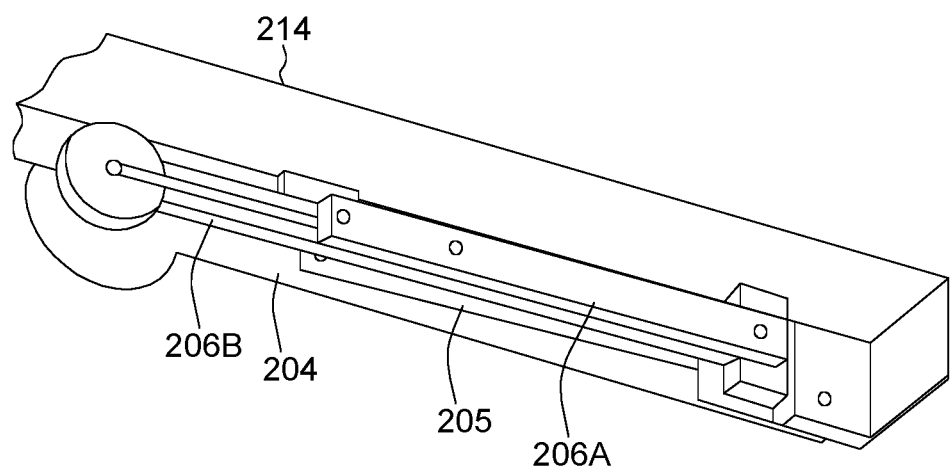

FIG. 21D is a perspective of the joint where the front leg and middle support are connected.

FIGS. 22A-22E show the cart 200 of the fourth embodiment folding sequence in various stages of folding.

In the fourth embodiment as shown in FIG. 23A, a deck 202 could have a cut out section to allow for the fold out toe plate 212 to rest flush on the same plane as the rest of the deck when not deployed. The toe plate 212 could be made of metal (e.g., aluminum) or high strength rigid structural plastic (e.g., glass reinforced plastic) that is attached to the deck 214. The toe plate 212 may be secured to the cart frame through a hinged bolt and bushing. The toe plate 212 could be deployed by hand and pivoted out to be used as a hand truck when the cart 200 is collapsed and tilted up on the front wheels 122 as shown in FIG. 23B. The versatile deck structures 214 allow for flat horizontal or vertical use of cart 200, and as well easy attachment of both horizontal and vertical oriented baskets. Also deck 214 may be configured to tilt side to side to allow easy of access to baskets/totes carry material in industrial lean manufacturing applications. As discussed, deck 202 could replace deck 102 in the first embodiment so that cart 100 would have a deck with a fold out toe plate as well.

Figure 24A:
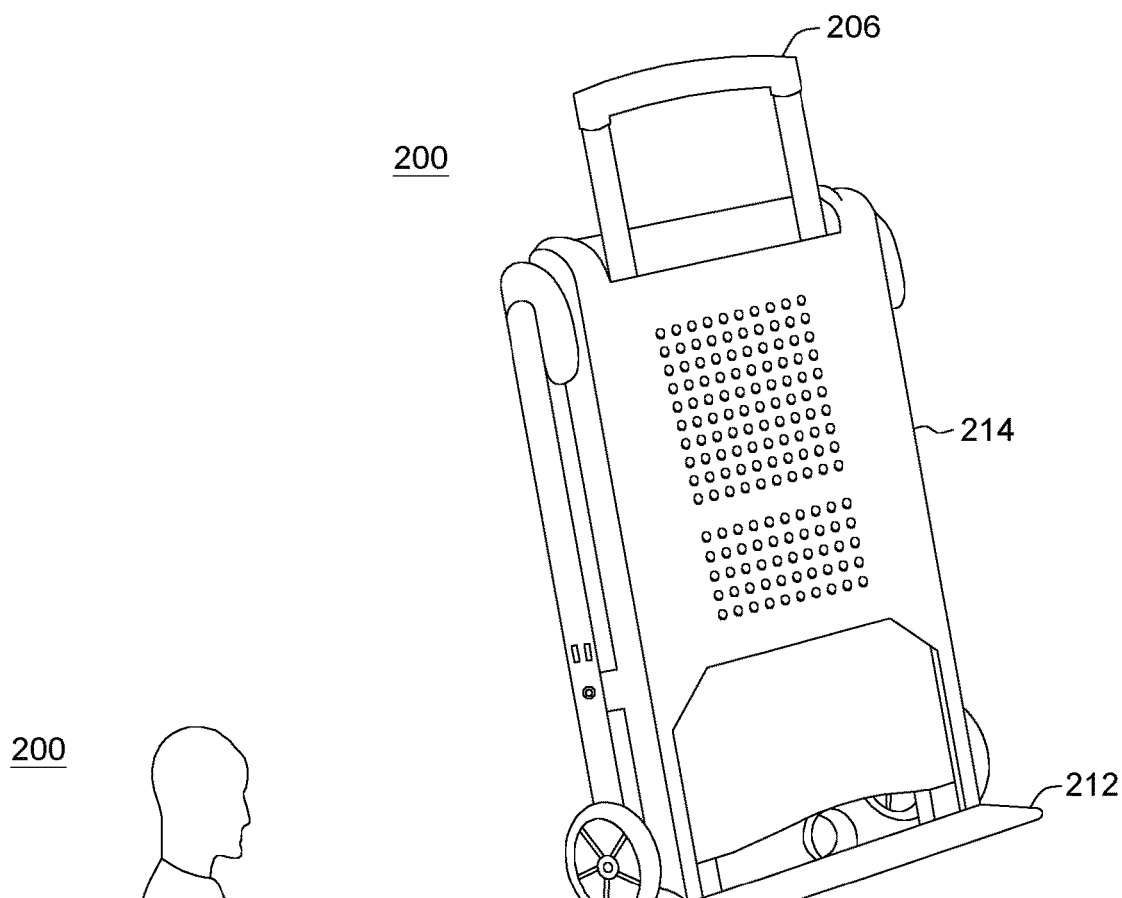
FIG. 24A shows the cart of the fourth embodiment (which could be the first embodiment as well) with the cart having a telescopic (or extendible) handle element extended out and FIG. 24B shows the cart in operation carrying a load.
Figure 24B:
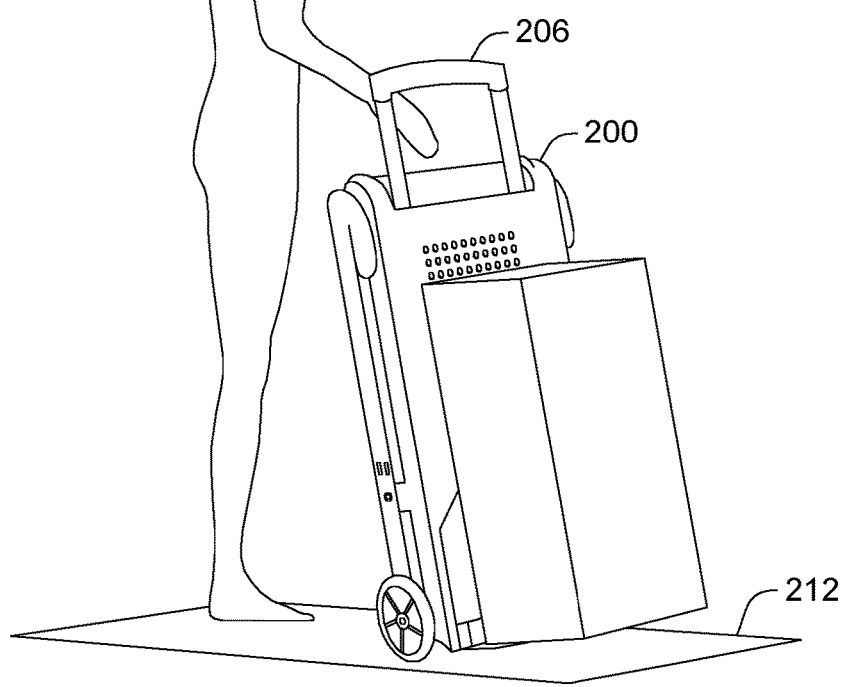

FIG. 24A shows an alternative version with the cart 200 having a telescopic (or extendible) handle element 206 extended out that may additionally contain the guide wheels or be completely separate. The handle element 206 may be an integrated extending and multi-positional handle for upright, hand truck and lowboy trolley use. If the tilt up handle is at 180 degrees it may have the controls for the guide wheels and folding. Otherwise an independent slide out handle may not have for controls in hand truck mode. In alternative embodiments, the telescopic hand truck handle 206 may be positioned on the opposing side of the cart from the cart hand grips and handle. When the cart 200 is used as a hand truck as shown in FIG. 24B, this telescopic truck handle can be extended to accommodate a comfortable control height. In a first position, it will extend enough for hand truck use, and in its maximum extended position it may also hinge to a second upright position which is substantially perpendicular to the horizontal deck as an alternative low boy handle. The telescopic truck handle may be constructed of telescopic aluminum tube with a cushioned and non-slip grip.

Figure 25:
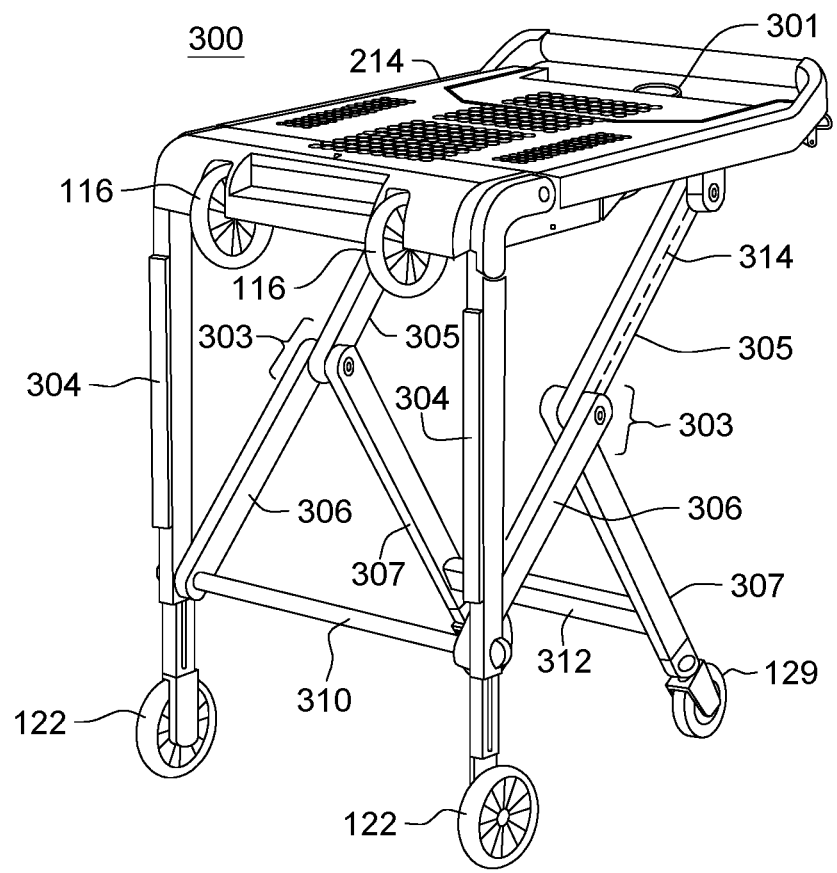
FIG. 25 is a perspective view of a fifth embodiment of the cart of the present disclosure.
Figure 26:
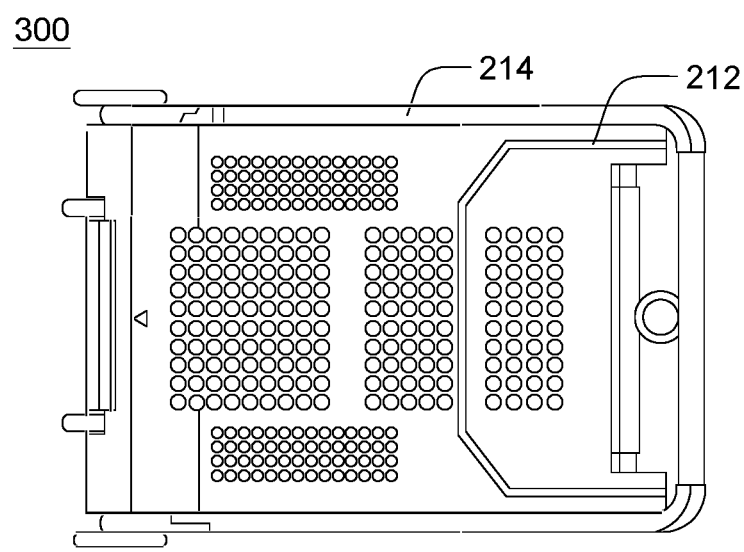
FIG. 26 is a top view of the cart of the fifth embodiment.

FIGS. 25-31B show a perspective view, top view, side view and rear (or operator) view, respectively, of the fifth embodiment of the folding cart 300. The fifth embodiment operates similarly to the first through fourth embodiments and like reference numerals refer to the same elements associated with these embodiments. The fifth embodiment however features a folding three way joint mechanism 303 instead of the dual sliding linkage system 130 or sliding bearing system 202. In FIG. 25 the cart is open, erect and sitting on the ground. The cart 300 also has guide wheels 116 for resting on the vehicle. Deck 214 is supported by front strut (or axle) 304, diagonal supporting struts (or axles) 305 and 306, and diagonal rear strut (or axle) 307. Front strut brace 310 provides lateral support for front struts 304 and diagonal supporting struts 305 and 306. Rear strut brace 312 provides lateral support for diagonal rear struts 307.

Figure 29:
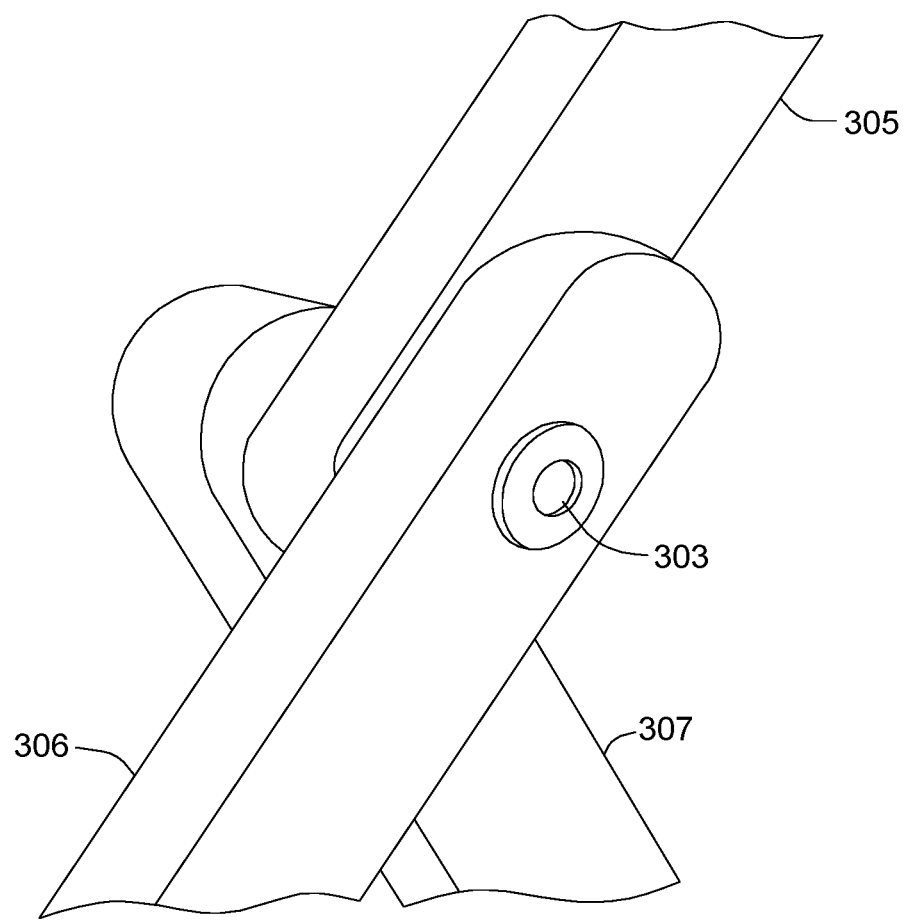
FIG. 29 shows a detailed view of a three way joint mechanism of the cart of the fifth embodiment.

To start the folding routine, the operator slides a guide wheel control lever 301 to the side to eject and extend the guide wheels 116 to stabilize the load on the deck 202 with the vehicle cargo platform surface. The operator then pushes the cart 300 until the guide wheels 116 are resting on the cargo area or trunk of a vehicle. Once the guide wheels are extended, the operator then lifts release lever 302 to start the folding routine for front strut 304, upper diagonal supporting struts 305, lower diagonal supporting struts 306, and diagonal rear struts 307. The release lever 302 applies a force through three way joint mechanism 303. The three way joint mechanism (or axle joint assembly) 303 forms a union for struts 305, 306 and 307 as shown in FIG. 29. Three way joint mechanism is a positive locking-variable position multi-link joint (PLVPMJ) assembly connecting struts 305, 306, and 307. This three way joint mechanism 303 allows upwards of 270 degrees of rotation and positive locking in various positions to secure struts 304, 305, 306 and 307 in full open and fully closed positions. Additionally, other partially collapsed/folded positions are possible to orient the cart 300 for easier mobility up and down stairs for example.

Figure 27:
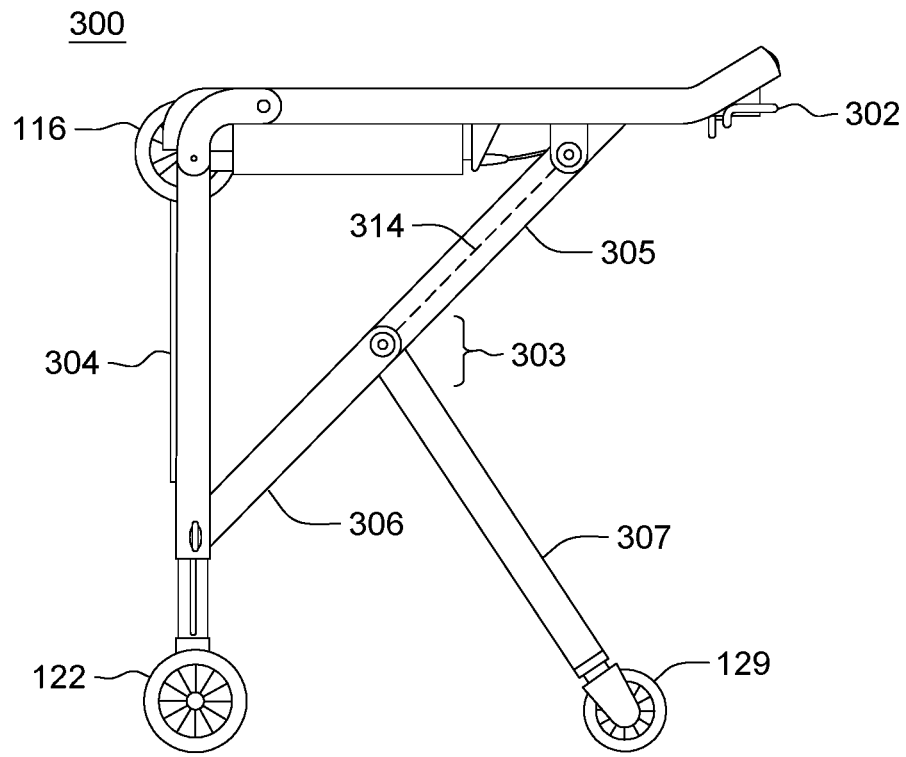
FIG. 27 is a side view of the cart of the fifth embodiment.
Figure 28:
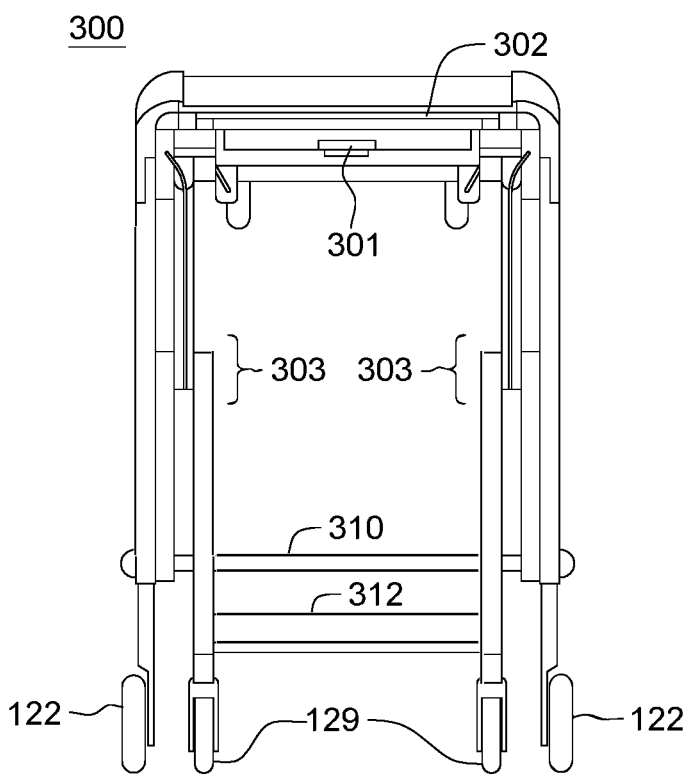
FIG. 28 is a rear operator view of the cart of the fifth embodiment.
Figure 30A:
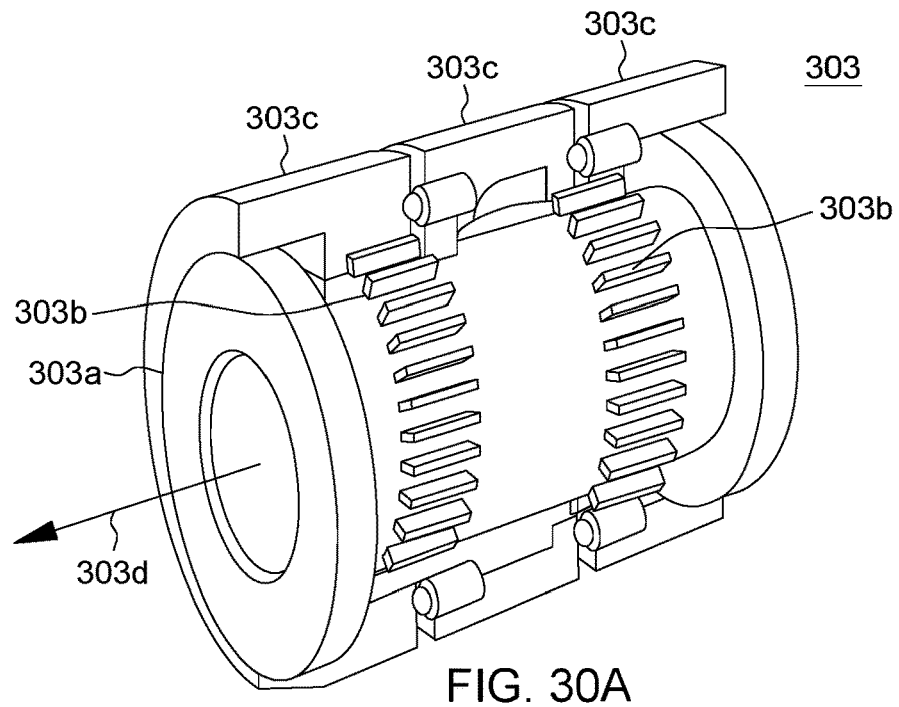
FIGS. 30A-30C show a detailed view of the internal components of the three way joint mechanism of the cart of the fifth embodiment.
Figure 30B:
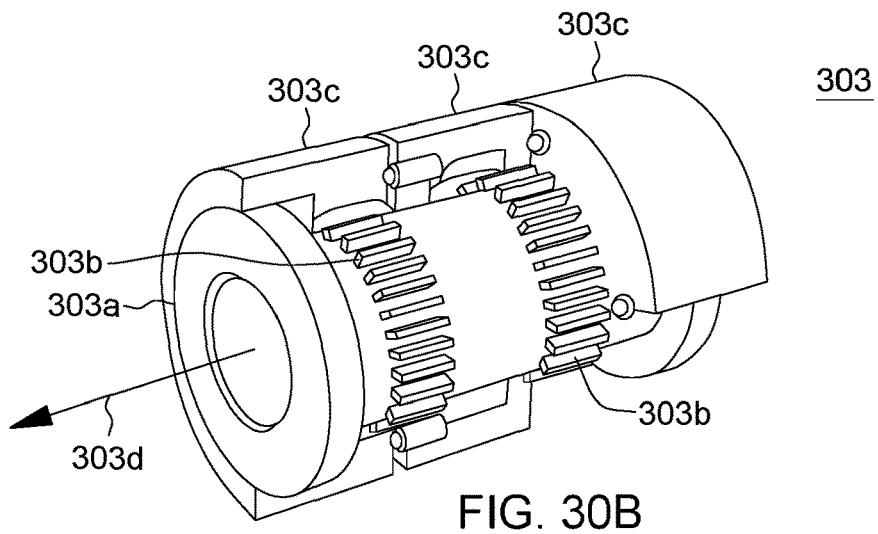
Figure 30C:
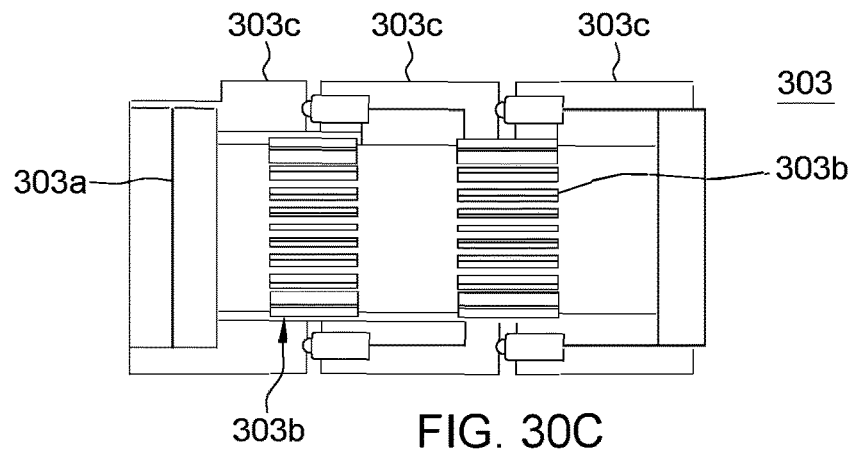

As shown in the internal views of mechanism 303 in FIGS. 30A-30C, the PLVPMJ assembly 303 includes a joint hinge 303a having locking gear (or spline teeth) 303b that engage to mating parts 303c to "lock" the joint hinge 303a in position. These elements 303b and 303c are disengaged by means of a cable 314 (as shown in FIG. 27) which is attached at the other end to a release handle element 302. When release handle element 302 is squeezed it forces the separation of mating parts 303b and 303c to allow joint hinge 303a to rotate about the axle and bushing. Three way joint 303 is unlocked which allows its internal members 303b and 303c to rotate about its center axis 303d. Pushing the cart 300 into the vehicle begins the folding action, when the front leg strut 304 contacts the rear bumper of the vehicle it is pushed backward causing the upper diagonal supporting strut 305 and lower diagonal supporting strut 306 to pivot about the three way joint 303. Continued insertion into the vehicle then allows all elements 304, 305, 306 and 307 to fold in together until fully folded.

Figure 31A:
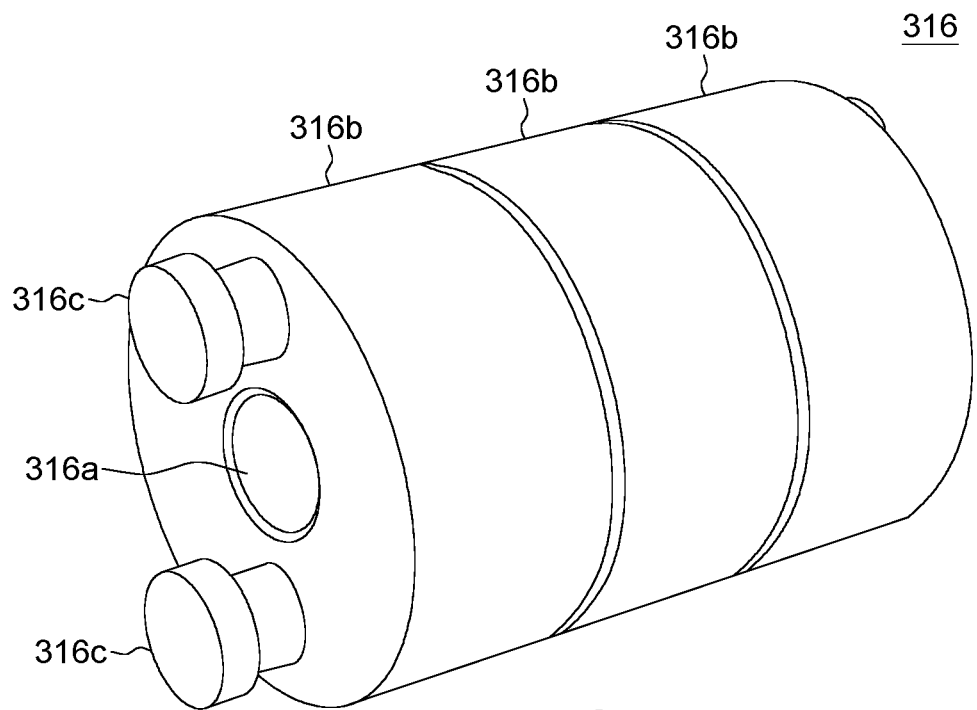
FIGS. 31A-31B show an alternative pin and bushing mechanism of the three way joint mechanism of the cart of the fifth embodiment.
Figure 31B:
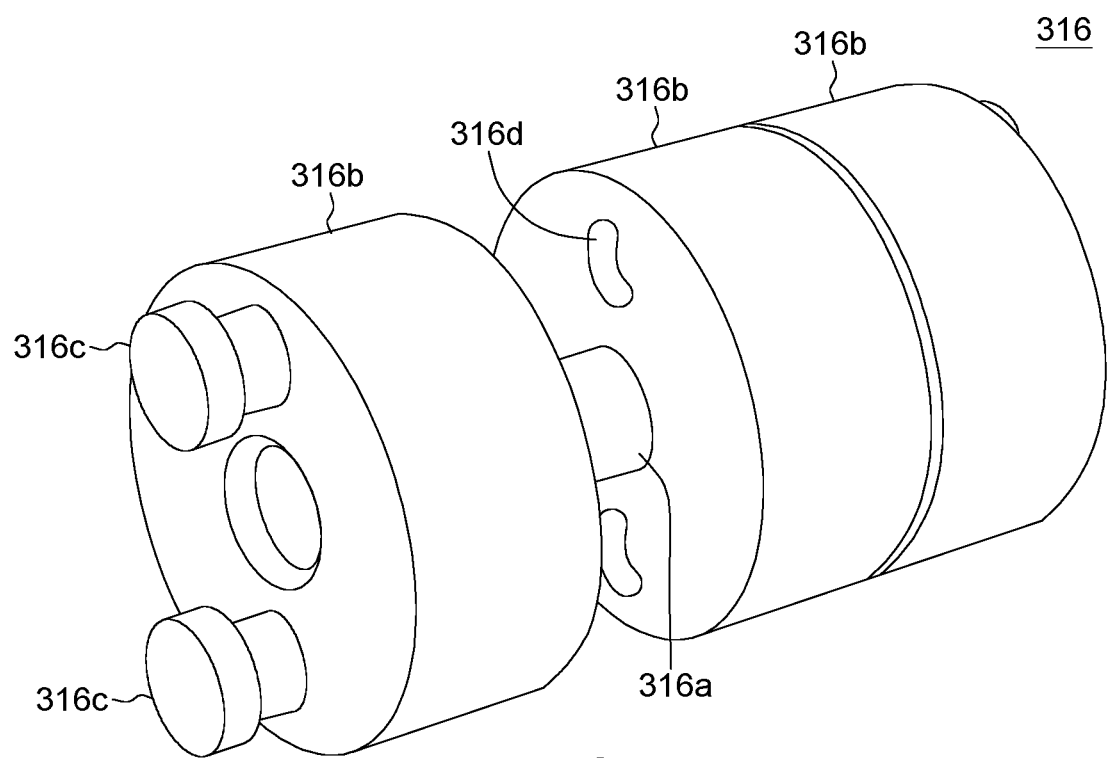

FIGS. 31A and 31B show an alternative pin and bushing mechanism 316 for PLVPMJ assembly 303. This mechanism 316 is similar in operation to joint assembly 303 in that each requires the separation of the three members to allow rotation. So the control level 302 would be same to release a spring 316a that compresses three rings 316b and allows separation of pins 316c that lock in place. One distinction between assembly 303 and mechanism 316 is that assembly 303 employs a spline 303b for many position orientation and whereas the mechanism 316 simply has holes 316d for position orientation that the pivot (or locking) pins 316c rotate into.

The present disclosure is preferably configured for the vast majority of suburban utility vehicles (SUVs), pickups, sedans and crossover vehicles for "straight in" storage into the back area of the vehicle (meaning the cart 100 will not need to be turned to allow for unimpeded closing of the hatch, trunk lid, and/or gate or the like) Where storage area depth is limited, the guide wheels 116 will preferably collapse back into the deck frame (spring loaded) to create a more compact overall length. With cart and payload safely stored in the vehicle's rear storage area, the hatch, trunk lid, or gate can be closed. If cargo area has limited depth the carts disclosed herein can preferably be turned 90 degrees to accommodate storage. In alternative embodiments, a slide and swivel may be included. The slide and swivel may be integrated with the cart. The slide and swivel will have a sliding surface that allows for easy positioning of the cart in the rear of the vehicle storage area. This integrated slide and swivel may be incorporated on the anti sway bracing and will allow a swivel (or pivot) of 90 degrees to facilitate turning the cart 100, 200, or 300 in a vehicle storage area where the depth is limited. The slide and swivel could be a nylon surface or even a ball caster.

Alternate embodiments may also include one or more of the following. A cart configured to be a "pro" version and work with a pickup size truck. A cart can be just a suburban utility vehicle (SUV) size. In alternative embodiments, the deck (102 or 214) may include straps or hold downs to keep a load securely in place. The deck (102 or 214) may be a unistrut or T-slot table top for flexibility to affix a wide variety of items. The deck (102 or 214) may have an integrated radio; electrical outlet(s); basket(s); cooler(s); shelf or drawer; iPod/iPad docking; writing surface; purse holder; headrest for mechanic's creeper; and/or incorporated radio frequency identification (RFID) technology. The cart could have a tilt lift (i.e., ground to horizontal). The cart could have self-generating (friction) power; stair-climbing capability; pneumatic assisted height adjustment; power life mechanism; and/or an ultra-lightweight tilt frame for incorporation into luggage. A military version could be built that is more sturdily configured. A lightweight baby stroller option could also be configured.

The present disclosure aims to alleviate multiple material handling steps to improve the way people work, shop and getaway. Unlike a traditional cart or hand truck, the present disclosure's design eliminates the need to either unload the cart or hand truck, or to lift either the payload or the material handling device to load into the back of a vehicle (e.g., pickup truck, SUV, crossover, sedan). Preferably, the present disclosure will allow for ease of use, ergonomics and cost effective manufacturing to allow for broadest use applications. The cart's support legs and attached caster wheels are capable of rolling and steering easily with the payload (i.e., materials, products, tools, resources, etc.) on the configurable top cart deck 102, 214 at ergonomic waist height. Then, preferably, in order to stow the cart and payload together (i.e., without removing the payload) in the back of the vehicle, the support legs will fold up preferably without lifting and fold to a near flat (i.e., deck, legs and wheels) configuration as the combined cart with payload roll into the back of the vehicle.

The versatile top deck 102, 214 can be configured flat for certain bulk loads (e.g., gardening soils, plant flats, etc.), professional tools (e.g. table or miter saws, etc.), as a basket for small items (e.g., typical grocery shopping). Alternatively the entire cart 100 can be folded and then tilted into a vertical orientation, and an integrated "toe plate" 212 can be folded out (from its recessed position in the deck) to allow the present disclosure to operate as a traditional hand truck. Yet another configuration is as a low boy trolley and another is as a vertical laundry or grocery cart as is typically found in urban environments. Preferably, in a folded horizontal configuration the disclosure can be used as a mechanic's creeper.

Today's grocers and retailers maintain costly fleets of shopping carts, baskets and bags. Environmentally, virtually everyone is looking for ways to reduce cost and waste. Privately owned carts are widespread, and in fact are frequently used in urban environment and college campus settings where high rise living is prevalent. A wider use of privately owned ergonomic carts would minimize the need for paper and plastic interim bagging (which often turns into waste in a land fill), reduce labor, speed throughput and lower waste and overall costs.

The promise of reduced lifting will be well received by the senior population wanting to maintain independence, as well as others in the global population that have trouble lifting or already experience back pain. In the ultra competitive construction business, movement of heavy items (e.g., tools and supplies) to and from job sites is well known. The ability to have one person operation is increasingly necessary to be cost competitive, so current solutions which require two people to lift something into a vehicle need to be minimized.

An advantage of the disclosed embodiments may include ease of use, flexible storage solutions, multiple configurations, no lifting and low cost to manufacture in one product.

The following U.S. Patent Documents are incorporated herein by reference: U.S. Pat. Nos. 3,082,016; 3,493,262; 3,669,031; 6,070,899; 6,575,491; 6,578,856; 6,860,493; 6,976,696; 7,080,844; 7,188,847; 7,229,903; 7,252,302; 7,427,080; 7,658,388; 7,854,444; D495,846; D608518; 2,565,820; 3,637,232; 5,649,718; 6,045,150; 6,328,319; 6,419,244; 6,526,611; 6,701,545; 7,017,939; 7,331,596; 7,513,511; 7,806,426; and U.S. Publication Nos. 2002/0105169 and 2009/0230642.

The foregoing embodiments are presently by way of example only; the scope of the present disclosure is to be limited only by the following claims.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes. Although these processes may describe the operations as a sequential process, many of the operations can be performed in parallel or concurrently. In addition, the order of the operations may be rearranged. A process may have additional steps not included in the figures. Also, a number of steps may be undertaken before, during, or after the above elements are considered.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Accordingly, the above description does not limit the scope of the disclosure.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration only and not as a definition of the limits of the claims.

What is claimed is:

1. A folding cart comprising:
   a deck supported by a plurality of front legs and a plurality of rear legs when in an open position;
   said rear legs each having a one of a plurality of sliding links coupled to a plurality of lower hinges which are attached to each of the plurality of front legs and coupled to a plurality of upper hinges which are attached to the deck; and
   said plurality of sliding links upon activation causing the plurality of lower hinges and the plurality of upper hinges to bend sequentially to cause the plurality of front legs and the plurality of rear legs to fold to a compact position.

2. The cart of claim 1, further comprising:
   a first handle having a first control lever; and
   wherein said first control lever is capable of being activated to force at least one of a plurality of guide wheels into an operating position.

3. The cart of claim 2, further comprising:
   a second handle having a second control lever; and
   wherein said second control is capable of activating at least one of a plurality of sliding links through a release cable.

4. The cart of claim 3, further comprising:
   a safety lock incorporated into at least one of a plurality of guide wheels so that when the at least one of the plurality of guide wheels is in the operating position the at least one of the plurality of guide wheels is deflected to allow disengagement of at least one of the plurality of sliding links.

5. The cart of claim 3, further comprising:
   a safety lock incorporated into the guide wheel axle assembly so that when the at least one of the plurality of guide wheels is in the operating position the at least one of the plurality of guide wheels is deflected to allow disengagement of at least one of the plurality of sliding links.

6. The cart of claim 1 wherein the sliding links are part of link mechanisms and each of the link mechanisms further include:
   a first link connected to at least one of the plurality of lower hinges and to at least one of a plurality of first straight tracks by one of a plurality of first pivot pins; and
   said at least one first pivot pin connected to the rear leg release cable which is capable of moving the at least one first pivot pin from at least one first pin first position to at least one first pin second position upon activation of the rear leg release cable.

7. The cart of claim 6, wherein each of the link mechanisms further include:
at least one of a plurality of second links connected to the at least one upper hinge and to at least one of a plurality of second straight tracks by one of a plurality of second pivot pins; and
said at least one second pivot pin forced by one of a plurality of rear leg springs from at least one of a plurality of second pin first positions to at least one of a plurality of second pin second positions.

8. The cart of claim 1, wherein each of the plurality of front legs and the plurality of rear legs are both affixed to the deck at a forward position of the deck.

9. A cart comprising a horizontal deck, two or more vertical support members for supporting the deck and connected to hinged members each having pivot points which are activated by a plurality of sliding links, and two or more wheels wherein the cart can be oriented in different configurations to accommodate different loads and transport requirements, the configurations comprising:
a first configuration wherein the vertical support members are vertically extended with the horizontal deck on top of the vertical support members, wherein the wheels are on the bottom of the vertical support members and the hinged members are fully extended at the pivot points and the plurality of sliding links are in a first position, wherein the pivot points allow the vertical support members to sweep toward the back of the cart wherein the vertical support members fold only at one end of each of the vertical support members; and
a second configuration wherein the hinged members are folded about the pivot points and the plurality of sliding links are in a second position so that the support members are substantially parallel to and under the horizontal surface.

10. The cart of claim 9 wherein a surface of the horizontal deck is adapted to accept affixed loads.

11. The cart of claim 9, wherein two of the vertical supporting members are front legs and two of the vertical supporting members extend diagonally beneath the deck to form rear legs;
said rear legs each having a one of the plurality of sliding links of the coupled to at least one of a plurality of lower hinges which are attached to each of the plurality of front legs and coupled to at least one of a plurality of upper hinges which are attached to the deck; and
said plurality of sliding links capable of bending the plurality of upper hinges and the plurality of lower hinges to cause the plurality of front legs and plurality of rear legs to the second configuration.

12. The cart of claim 11 wherein the plurality of sliding links are part of link mechanisms which further include:
a first sliding link of the plurality of sliding links connected to at least one of the plurality of lower hinges and to at least one of a plurality of first straight tracks by one of a plurality of first pivot pins;
said at least one of the plurality of first pivot pins connected to a rear leg release cable which is capable of moving the at least one of the plurality of first pivot pins from at least one first pin first position to at least one first pin second position upon activation of the rear leg release cable;
a second sliding link of the plurality of sliding links connected to the at late least one upper hinge and to at least one of a plurality of second straight tracks by one of a plurality of second pivot pins; and
said at least one of the plurality of second pivot pins forced by one of a plurality of rear leg springs from at least one of a plurality of second pin first positions to at least one of a plurality of second pin second positions.

13. The cart of claim 9, further comprising:
a first handle having a first control lever; and
wherein said first control lever is capable of being activated to force a plurality of guide wheels into an operating position.

14. The cart of claim 13, further comprising:
a second handle having a second control lever; and
wherein said second control is capable of activating the plurality of sliding links to form the cart into the second configuration.

15. A method of folding a cart comprising:
activate a first control lever to extend a guide wheel assembly to allow stabilization of the cart on a horizontal surface in response to a squeezing of a first control lever to eject;
deflect the guide wheel assembly when at least one guide wheel is in the operating position to operate a safety lock to allow disengagement of a linkage mechanism;
activate a second control lever to apply a force through a cable to the linkage mechanism to pull rear leg lower tray linkages that cause the lower hinge pair to start bending and a rear leg to unlock allowing a rear leg lower tray link pivot pin and rear leg stabilizer brace link pivot pin to slide axially within the linkage mechanism while the rear leg fold only at a top of the upper leg section; and
push the cart into a vehicle to cause a front leg to be pushed back to be braced against the rear leg causing the lower hinge pair to bend further and the upper hinge pair to start folding and continue until the front legs and rear legs are fully folded.

16. The method of claim 15, further comprising:
bend a rear leg lower extendible inserts on a rear leg hinge to make the folded cart more compact.

17. The method of claim 15, wherein the linking mechanism includes sliding links.

* * * * *